(12) United States Patent
Hashimoto et al.

(10) Patent No.: US 7,830,602 B2
(45) Date of Patent: Nov. 9, 2010

(54) IN-VEHICLE STEREOIMAGE DISPLAY APPARATUS

(75) Inventors: Takahiro Hashimoto, Tokyo (JP); Makoto Ikeda, Tokyo (JP); Hiroyuki Nemoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 402 days.

(21) Appl. No.: 12/066,098

(22) PCT Filed: Oct. 26, 2006

(86) PCT No.: PCT/JP2006/321317

§ 371 (c)(1), (2), (4) Date: Mar. 7, 2008

(87) PCT Pub. No.: WO2007/049664

PCT Pub. Date: May 3, 2007

(65) Prior Publication Data

US 2009/0231698 A1 Sep. 17, 2009

(30) Foreign Application Priority Data

Oct. 26, 2005 (JP) ............................... 2005-311782

(51) Int. Cl.
G02B 27/22 (2006.01)

(52) U.S. Cl. .......................... 359/463; 359/462; 349/15; 348/59

(58) Field of Classification Search ................. 359/463, 359/462; 349/15; 348/59
See application file for complete search history.

(56) References Cited

U.S. PATENT DOCUMENTS 5,883,739 A * 3/1999 Ashihara et al. ............ 359/462
6,337,721 B1 * 1/2002 Hamagishi et al. ............ 349/15

(Continued)

FOREIGN PATENT DOCUMENTS

CN 1385714 A 12/2002

(Continued)

OTHER PUBLICATIONS

Börner, R. Four Autostereoscopic Monitors on the Level of Industrial Prototypes. Displays 20 (1999). pp. 57-64.

(Continued)

*Primary Examiner*—Audrey Y Chang
(74) *Attorney, Agent, or Firm*—Marsh Fischmann & Breyfogle LLP

(57) ABSTRACT

An in-vehicle stereoimage display apparatus includes a display device, an erecting unit magnification lens module spaced from and facing toward a display screen of the display device for forming an erecting unit magnification stereoimage of an image displayed on the display screen, a lens movement mechanism for movably supporting the erecting unit magnification lens module, and a controller for changing the position of the erecting unit magnification lens module in accordance with the travel velocity of a vehicle. In one example, the controller increases the distance between the vehicle driver's eyes and the erecting unit magnification stereoimage as the travel velocity of the vehicle increases.

26 Claims, 18 Drawing Sheets

U.S. PATENT DOCUMENTS

| | | | |
|---|---|---|---|
| 6,377,295 B1 * | 4/2002 | Woodgate et al. | 348/59 |
| 6,611,384 B1 * | 8/2003 | Biverot | 359/630 |
| 6,801,243 B1 | 10/2004 | Van Berkel | |
| 7,561,217 B2 * | 7/2009 | Hu et al. | 349/15 |
| 2002/0176172 A1 | 11/2002 | Nemoto et al. | |
| 2003/0095079 A1 | 5/2003 | Ishikawa et al. | |
| 2005/0078370 A1 | 4/2005 | Nishihara et al. | |
| 2006/0139759 A1 | 6/2006 | Hashimoto et al. | |

FOREIGN PATENT DOCUMENTS

| | | |
|---|---|---|
| JP | 56-158320 A | 12/1981 |
| JP | 64-088502 A | 4/1989 |
| JP | 6-87043 U | 12/1994 |
| JP | 07-144578 A | 6/1995 |
| JP | 2001-501073 A | 1/2001 |
| JP | 3195249 B2 | 6/2001 |
| JP | 2004-118414 A | 4/2004 |
| JP | 2004-334590 A | 11/2004 |
| JP | 2006-177920 A | 7/2006 |
| JP | 2006-184542 A | 7/2006 |

OTHER PUBLICATIONS

First Office Action. Chinese Patent Application No. 200510135625.X. Mar. 28, 2008. English Translation. 7 pages.

* cited by examiner

Thickness:
Prior Art 1.69mm
Example2 1.66mm

IN-VEHICLE STEREOIMAGE DISPLAY APPARATUS

TECHNICAL FIELD

The present invention relates to an apparatus for forming an erecting unit magnification stereoimage and an apparatus for displaying an erecting unit magnification stereoimage, and more particularly, to a stereoimage display apparatus for displaying vehicle information in a passenger compartment.

BACKGROUND ART

A display apparatus that includes an erecting unit magnification optical system having a two-dimensional array of microlenses is described in, for example, Patent Document 1. In this display apparatus, a liquid crystal display is arranged at one side of the erecting unit magnification optical system. The erecting unit magnification optical system forms an erecting unit magnification stereoimage of an image displayed on the liquid crystal display at the opposite side of the liquid crystal display. In this stereoimage display apparatus, the erecting unit magnification stereoimage is emphasized on a blurred background image generated by a perforated color plate. When an observer looks at the erecting unit magnification stereoimage with both eyes, a floating image can be seen.

A conventional erecting unit magnification optical system used in a scanner or a copier is described in, for example, Patent Document 2. As shown in FIG. 1, the erecting unit magnification optical system includes two lens array plates 103. Each of the lens array plates 103 has a plurality of microlenses 103a that are arranged in such a manner that their optical axes are parallel to one another. The optical axes of the microlenses 103a of one lens array plate 103 are aligned with the optical axes of the microlenses 103a of the other lens array plate 103. The peaks of the microlenses 103a of one lens array plate 103 come in contact with the peaks of the microlenses 103a of the other lens array plate 103. In the erecting unit magnification optical system, a high-resolution image is produced when the spherical aberration of each microlens 103a is reduced.

To produce a high-resolution image, each microlens of the conventional erecting unit magnification optical system has a small spherical aberration. Thus, even a slight change in the distance between an object 15 (image shown on a liquid crystal screen) and the microlenses 103a would greatly blur the image 15a. Thus, the positional relationship between the conventional erecting unit magnification optical system and the object 15 cannot be changed.

The display apparatus described in Patent Document 1 is disadvantageous in that moire may be generated. Moire is a phenomenon in which a pattern of regular stripes is generated by the interference between the microlenses and the pixels of the liquid crystal display. Moire lowers the image quality.

An apparatus for displaying a three-dimensional image with suppressed moire is described in, for example, Non-Patent Document 1. This conventional apparatus displays a stereoimage on a lenticular sheet on which a plurality of cylindrical lenses are arranged. The cylindrical lenses on the lenticular sheet increase the resolution in units of sub-pixels and not in units of pixels. Each cylindrical lens emits monochromatic light of one of RGB. This structure suppresses color moire. However, it is difficult to manufacture a cylindrical lens having dimensions that are smaller than a pixel. In particular, it is extremely difficult to manufacture a mold for the above lenticular sheet.

An apparatus for displaying a stereoimage with suppressed moire is described in, for example, Patent Document 3. This three-dimensional image display apparatus includes a planar display and a screen. The planar display has a plurality of pixels, each of which includes three sub-pixels. The screen divides the image into disparity images by limiting the travel direction of light emitted from each sub-pixel. The disparity images are viewed by the observer as a three-dimensional image. To suppress moire, the screen includes screen elements that are arranged at an interval obtained from the sum of an integral multiple number of the pixel pitch and an integral multiple number of the sub-pixel pitch. With this structure, moire would become too narrow to be recognized. However, this structure suppresses moire only when the planar display is spaced by a predetermined distance from the screen. This structure does not permit the distance between the planar display and the screen to be changed.

Examples of other display apparatuses for displaying stereoimages are described in Patent Documents 4 and 5. However, the positions of images displayed by the apparatuses of Patent Documents 4 and 5 are fixed and cannot be changed.

Patent Document 1: Japanese Patent No. 3195249

Patent Document 2: Japanese Laid-Open Patent Publication No. 64-88502

Patent Document 3: Japanese Laid-Open Patent Publication No. 2004-118414.

Patent Document 4: Japanese Laid-Open Patent Publication No. 07-144578

Patent Document 5: Japanese Laid-Open Patent Publication No. 2004-334590

Non-Patent Document 1: R. Börner, "Displays 20 (1999)"

DISCLOSURE OF THE INVENTION

It is an object of the present invention to provide a stereoimage display apparatus for forming a stereoimage of an object at various positions, and in particular, to an in-vehicle stereoimage display apparatus applicable for use in a vehicle.

To achieve the above object, the present invention provides an in-vehicle stereoimage display apparatus including a display device having a display screen. An erecting unit magnification lens module, spaced from and facing toward the display screen of the display device, forms an erecting unit magnification stereoimage of an image displayed on the display screen. A lens movement mechanism movably supports the erecting unit magnification lens module. A controller, connected to the lens movement mechanism, changes the position of the erecting unit magnification lens module in accordance with the travel velocity of the vehicle.

It is preferred that the erecting unit magnification lens module forms the erecting unit magnification stereoimage at a side of the lens module opposite to the display device, and at least a portion of a space in which the erecting unit magnification stereoimage is formed is surrounded by a darkly colored member.

It is preferred that the controller controls the lens movement mechanism so that the distance between the vehicle driver's eyes and the erecting unit magnification stereoimage increases as the travel velocity of the vehicle increases.

In one example, the controller increases the distance between the vehicle driver's eyes and the erecting unit magnification stereoimage in a stepped manner when the travel velocity of the vehicle increases.

In one example, the controller increases the distance between the vehicle driver's eyes and the erecting unit magnification stereoimage in a stepless manner when the travel velocity of the vehicle increases.

It is preferred that the controller controls the lens movement mechanism so that the distance between the erecting unit magnification lens module and the display device decreases as the travel velocity of the vehicle increases.

In one example, the erecting unit magnification stereoimage includes an image that dynamically indicates a vehicle state and a travel state of the vehicle in real time.

In one example, the erecting unit magnification stereoimage includes an additional image that indicates information other than the vehicle state and the travel state.

It is preferred that the erecting unit magnification lens module includes at least two lens array plates. Each lens array plate includes a plurality of microlenses, with each having a peak, and the microlenses having parallel optical axes. The peaks of the microlenses in one of the at least two lens array plates are in contact with or arranged close to the peaks of the microlenses in the other one of the at least two lens array plates. The microlenses in each lens array plate each have a predetermined spherical aberration that is greater than a minimum spherical aberration or a predetermined comatic aberration that is greater than a minimum comatic aberration.

It is preferred that the lens module has a thickness in the direction of the optical axes of the microlenses, and the thickness is less than a designed thickness value that minimizes the spherical aberration or the comatic aberration of each microlens.

It is preferred that the at least two lens array plates are integrated to form one of the erecting unit magnification lens module.

It is preferred that when the at least two lens array plates spaced from the display screen of the display device by a front side working distance, a light beam from the display screen passes through a single point on a surface of each microlens. When the front side working distance changes, the light beam passes through a point differing from the single point on the surface of each microlens.

It is preferred that each lens array plate has a rear side working distance in a range of 5 to 150 mm, in which the resolution is 10% or greater for 1 Lp (line pair/mm), with a resolution change rate being greater than 0%/mm and 2%/mm or less.

It is preferred that each lens array plate includes a substrate having two main surfaces. A plurality of microlenses having spherical or non-spherical surfaces are arranged on one or both of the main surfaces of the substrate.

In one example, each lens array plate is made of a transparent resin.

It is preferred that a case accommodates the lens module and the display device. The case has an inner chamber for accommodating a medium, the lens module is arranged between the inner chamber and the display device, and the lens module forms an image displayed on the display screen of the display device in the inner chamber of the case.

In one example, the display device displays a two-dimensional image.

It is preferred that the erecting unit magnification lens module includes a plurality of microlenses regularly arranged and an object side focal distance. The display device includes a display screen spaced from the erecting unit magnification lens module by the object side focal distance and a plurality of regularly arranged pixels. The erecting unit magnification lens module forms a stereoimage viewed as a floating image with an image shown on the image display screen. The lens movement mechanism enables the spaced distance between the erecting unit magnification lens module and the image display screen to be varied within a predetermined range. When the spaced distance between the erecting unit magnification lens module and the image display screen is varied within the predetermined range, the resolution of the erecting unit magnification lens module changes. When the spaced distance is within the predetermined range, the resolution of the erecting unit magnification lens module is greater than an upper limit value at which a blur is observable with human eyes.

It is preferred that the erecting unit magnification lens module is formed by at least two lens array plates, and each lens array plate includes a plurality of microlenses, with each having an optical axis and a peak, and the optical axes of the microlenses being parallel to one another. The peaks of the microlenses in one of the at least two lens array plates are in contact with or arranged close to the peaks of the microlenses in the other one of the at least two lens array plates. The microlenses in each lens array plate each have a predetermined spherical aberration that is greater than a minimum spherical aberration or a predetermined comatic aberration that is greater than a minimum comatic aberration.

It is preferred that when the plurality of pixels has a pixel pitch PD, the microlenses have a lens pitch PL, LA represents a distance between a viewpoint and the image display screen, LB represents a distance between the stereoimage and the viewpoint, Lz represents the spaced distance, and PLo represents a corrected lens pitch obtained by correcting the lens pitch PL in accordance with the distances LA, LB, and Lz, and when the spaced distance Lz is minimal, the corrected lens pitch PLo satisfies the expression of $(1.20+n*1.50) \leq PLo/PD \leq (1.70+n*1.50)$, where $n=0, 1, 2, 3, \ldots$.

It is preferred that the resolution MTF of the lens module is 10% or greater at 1 LP/mm when the spaced distance is within the predetermined range, and the resolution of the lens module is maximal when the spaced distance is a minimum value in the predetermined range.

In one example, the plurality of pixels are in a vertical stripe arrangement, and the plurality of microlenses are in a hexagonal arrangement or in a square arrangement.

In one example, the plurality of pixels are in a delta arrangement, and the plurality of microlenses are in a hexagonal arrangement or in a square arrangement.

In one example, the plurality of pixels form lines, the plurality of microlenses form lines, and the lines of the pixels are inclined relative to the lines of the microlenses.

In one example, each pixel is formed by a plurality of sub-pixels that are arranged at a constant pitch and respectively correspond to a plurality of colors, and the plurality of sub-pixels form a vertical stripe arrangement in which sub-pixels of the same color are continuously arranged in a vertical direction.

In one example, each microlens is hexagonal, and some of the pixels form a line, some of the microlenses form another line, and the line of the pixels is inclined at an angle of 90 degrees relative to the line formed by the microlenses.

BEST MODE FOR CARRYING OUT THE INVENTION

The terms used in the specification will be defined as follows.

The expression "erecting unit magnification" refers to the formation of an erecting unit magnification stereoimage when an image and a lens module are spaced from each other by a predetermined distance. The stereoimage display apparatus of the present invention includes an optical system that forms an erecting unit magnification stereoimage when the lens module is moved from a position spaced by the predetermined distance. Further, the stereoimage display apparatus of the present invention includes an optical system that forms an erect and variably-magnified image when the lens module is moved from a position that is spaced by the predetermined distance.

The "designed thickness value for reducing the spherical aberration or the comatic aberration of each microlens" refers to the thickness of a lens module that is designed to form an image of an object 15, which is arranged at a predetermined working distance from the lens module, as a high-resolution stereoimage 15a at a position spaced from the lens module by the predetermined working distance in the direction opposite the object 15.

Further, "Lp" refers to line pairs per millimeter and indicates how many pairs of black straight lines and white straight lines are present per millimeter.

A stereoimage formation apparatus according to a first embodiment of the present invention will now be described.

Figure 2:
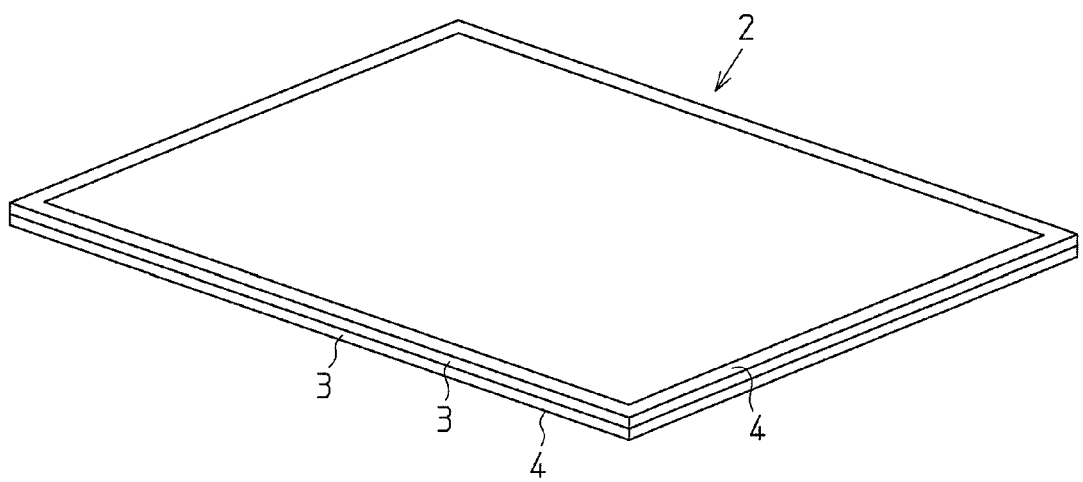
FIG. 2 is a perspective view showing an erecting unit magnification lens module according to a first embodiment of the present invention.
Figure 3:
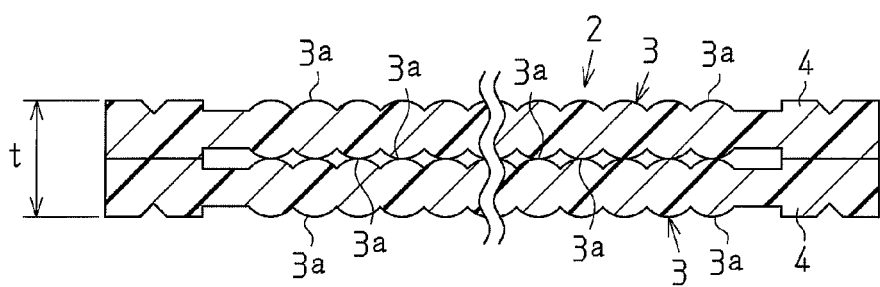
FIG. 3 is a cross-sectional view of the erecting unit magnification lens module of FIG. 2.

As shown in FIG. 2, an erecting unit magnification lens module 2, which functions as a stereoimage formation apparatus, is formed as a single rectangular thin plate. As shown in FIG. 3, the lens module 2 is formed by integrating two lens array plates 3. The two lens array plates 3 are integrated by, for example, adhering the plates 3 to each other or fixing the plates 3 to each other with a jig.

Figure 4:
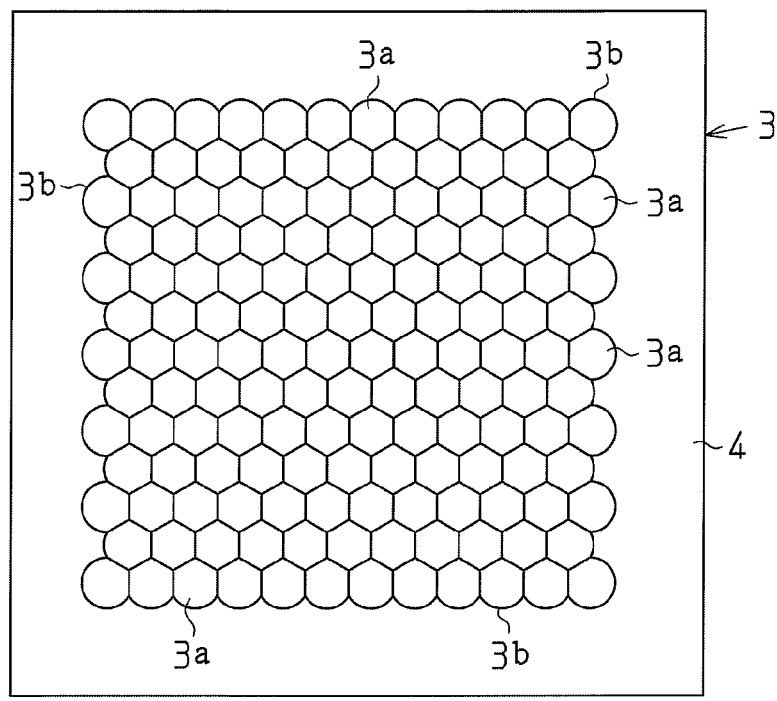
FIG. 4 is a plan view showing a lens array plate.

The two lens array plates 3 have the same structure. Each lens array plate 3 includes a substrate 4 and a plurality of microlenses 3a. The microlenses 3a are formed on the two main surfaces of the substrate 4. The microlenses 3a have spherical or non-spherical surfaces. The optical axes of the microlenses 3a included in each lens array plate 3 are parallel to one another. The optical axes of the microlenses 3a may be perfectly parallel to one another. Alternatively, the optical axes of the microlenses 3a may be inclined relative to one another to the extent at which a stereoimage can be formed. In each lens array plate 3, the microlenses 3a are arranged in a two-dimensional manner. FIG. 4 shows the microlenses 3a that are in a zigzagged arrangement. As shown in FIG. 3, the peaks of the microlenses 3a that are formed on the inner surface of one lens array plate 3 come in contact with the peaks of the microlenses 3a that are formed on the inner surface of the other lens array plate 3.

In the lens module 2, parts of each lens array plate 3 excluding the microlenses 3a may be fused and integrated together. A monolithic lens module 2 may be formed integrally through injection molding.

The microlenses 3a include a group of outer microlenses that are close to the rim of each lens array plate 3 and a group of inner microlenses that are surrounded by the outer microlenses. As shown in FIG. 4, each inner microlens 3a is hexagonal. Each outer microlens 3a has a circular periphery 3b at a position close to the rim of the lens array plate 3. The circular periphery 3b of each outer microlens 3a does not come in contact with other microlenses 3a. The microlenses 3a are arranged in contact with one another without gaps formed therebetween. Alternatively, instead of the circular periphery 3b, each outer microlens 3a may have a polygonal periphery, such as a square or hexagonal periphery.

The positions of the two lens array plates 3 are adjusted in a manner to form an erecting unit magnification stereoimage. The two lens array plates 3 may be arranged, for example, in a manner that the optical axes of the microlenses 3a of one lens array plate 3 and the optical axes of the microlenses 3a of the other lens array plate 3 are aligned with each other (extend along a straight line) or are not aligned with the each other. The peaks of the microlenses 3a of one lens array plate 3 come in contact with the peaks of the microlenses 3a of the other lens array plate 3. The microlenses 3a of each lens array plate 3 have the same lens capability. Each microlens 3a has a desired spherical aberration or a desired comatic aberration. The spherical aberration or the comatic aberration of each microlens is determined by the curvature of the surface (lens surface) of the microlens or the total thickness t (refer to FIG. 3) of the two lens array plates 3 in the direction of the optical axis.

The total thickness t of the two lens array plates 3 is smaller than the designed thickness value for reducing the spherical aberration or the comatic aberration of each microlens 3a (the thickness t1 in the prior art (refer to FIG. 1)). In the present invention, the microlenses 3a are formed to have a desired spherical aberration or a desired comatic aberration. For example, the microlenses 3a may be formed to have a relatively large spherical aberration or comatic aberration.

Figure 6:
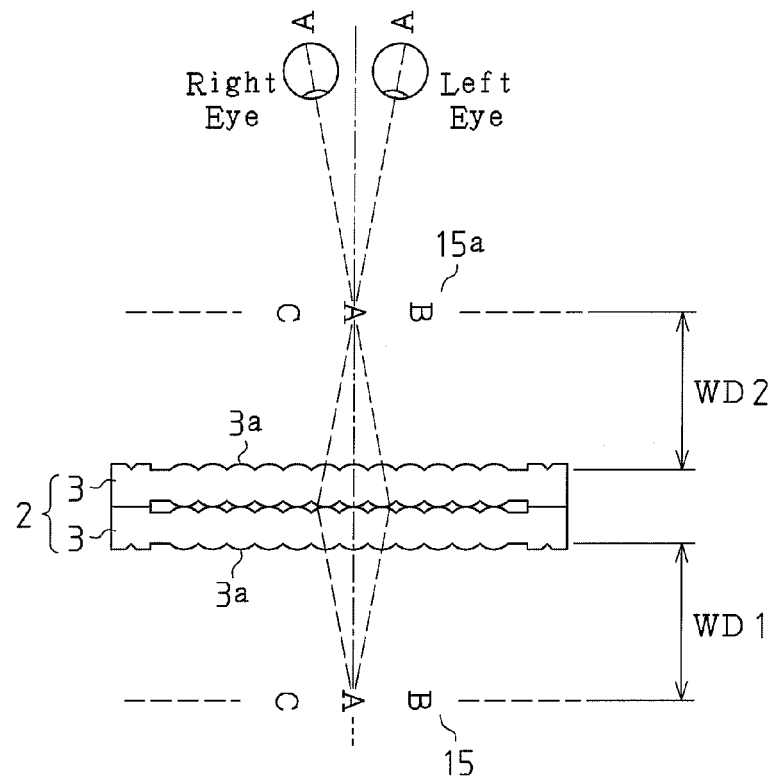
FIG. 6 shows the formation of an image.
Figure 7:
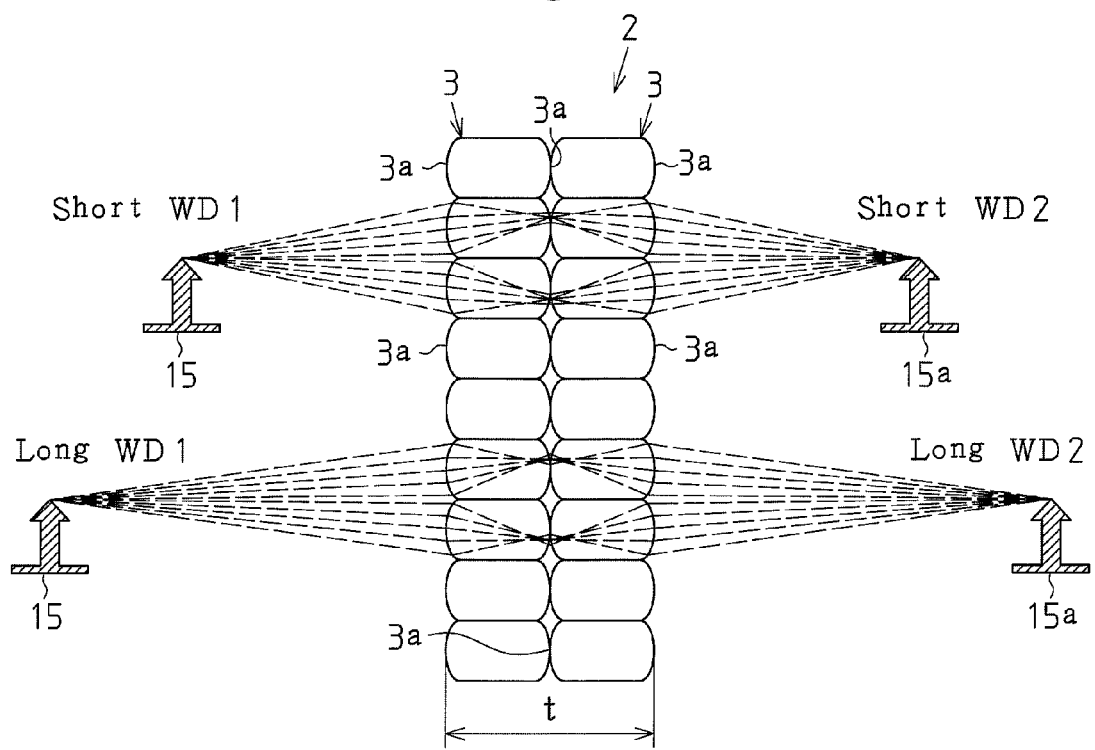
FIG. 7 shows the formation of an image that changes when a front side working distance changes.

As shown in FIG. 7, an object 15 is arranged to face the lens module 2. Light beams from the object 15 pass through the lens surface of each microlens 3a. The lens module 2 forms the image 15a of the object 15 at the side opposite the object 15. FIG. 6 shows a front side (object side) working distance WD1, which is the distance between the object 15 and the lens module 2, and a rear side (image side) working distance WD2, which is the distance between the lens module 2 and the image 15a.

FIG. 7 shows the optical paths of the light beams when the front side working distance WD1 is short and when the front side working distance WD1 is long. When the object 15 is close to the lens module 2 (when the front side working distance WD1 is short), the light beams from the object 15 form an image after traveling through relatively outer portions of the microlenses 3a, that is, after traveling through positions distant from the axes of the microlenses 3a. When the object 15 is distant from the lens module 2 (when the front side working distance WD1 is long), the light beams from the object 15 form an image after traveling through relatively inner portions of the microlenses 3a, that is, after traveling through positions close to the axes of the microlenses 3a. The positions in the lens surfaces of the microlenses 3a through which the light beams pass vary as the front side working distance WD1 varies. In other words, the light beams from the object 15 pass through optimum positions in the lens surfaces of the microlenses 3a in accordance with the front side working distance WD1. The light beams passing through the optimum positions in the microlenses 3a form an image at a position spaced by the rear side working distance WD2 to generate a stereoimage 15a.

The lens module 2 is designed to form the image 15a that is clear enough so that it is not blurred when seen with human eyes. More specifically, the lens module 2 has the optical characteristics described below. When the rear side working distance WD2 is in the range of 5 to 150 mm, preferably, in the range of 5 to 100 mm, the resolution MTF (modulation transfer function) of each lens array plate 3 for 1 Lp is 10% or greater and the MTF change rate is greater than 0%/mm and less than or equal to 2%/mm. When the resolution MTF for 1 Lp is greater than about 10%, the image is seen with the human eyes without being blurred. Thus, when the rear side working distance WD2 is in the above range (imaging range), the image is seen with human eyes without being blurred. It is preferable that the resolution MTF for 1 Lp be 20% or greater to generate the image 15a with further clearness.

The rear side working distance WD2 is set in the range of 5 to 150 mm because the image 15a is not clearly seen with the human eyes when the rear side working distance WD2 is out of this range.

Each lens array plate 3 is made of a transparent resin, and the lens module 2 is made of resin. The materials for the lens module 2 and the lens array plates 3 is not limited to resin and may be made of other materials as long as it is transparent, such as glass. In each lens array plate 3, the lens portion that contributes to the formation of a stereoimage may be selectively formed from a transparent material. Alternatively, the lens module 2 and the lens array plate 3 may be entirely formed from a transparent material. The degree of transparency of the transparent material is determined so that the light beams passing through the lens module 2 result in a sufficient amount of light for forming a stereoimage.

Figure 5:
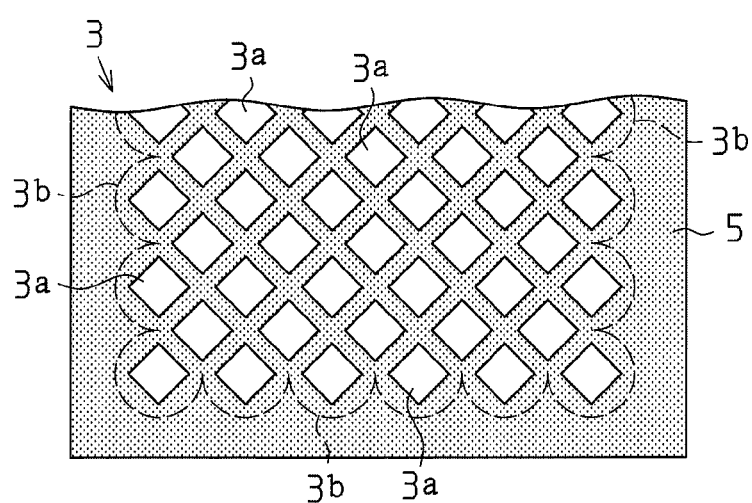
FIG. 5 is a plan view showing a light shielding film.

As shown in FIG. 5, at least one lens array plate 3 may include a light shielding film 5 for covering the peripheries of the microlenses 3a. Each microlens 3a is exposed with the same shape through openings in the light shielding film 5. By exposing the microlenses 3a with the same shape, the light shielding film 5 improves image uniformity. When the light shielding film 5 is not used, the image uniformity cannot be improved. However, the brightness of a stereoimage would be increased.

The first embodiment has the advantages described below.

The microlenses 3a of each lens array plate 3 are formed to have the desired spherical aberration or comatic aberration. Thus, the front side working distance WD1 is variable. For example, when the front side working distance WD1 is varied, the lens module 2 forms the erecting unit magnification stereoimage 15a of the object 15 as an image that is clear and not blurred when seen with the human eyes at a position spaced by the rear side working distance WD2, which is the same as the front side working distance WD1, at the side opposite the object 15. The erecting unit magnification stereoimage may be viewed as a floating or sinking image by varying the front side working distance WD1. Accordingly, the positional relationship between the lens module 2 and the object 15 may be varied.

The distance between the lens array plates 3 and the image 15a may be freely varied. This enables the extension in depth of the stereoimage to be varied.

All of the microlenses 3a of the two lens array plates 3 have the same lens capability. Thus, the lens module 2 has a high capability.

The thickness t of the lens module 2 in the direction of the optical axis, that is, the total thickness t of the two lens array plates 3, is less than the above-described designed thickness value. This enables the microlenses 3a of each lens array plate 3 to have a relatively large desired spherical aberration or comatic aberration.

The lens module 2 is a rectangular thin plate. Thus, the lens module 2 is easily handled and easily attached to a stereoimage display apparatus.

The lens area through which the light beams from the object 15 pass is substantially fixed and the transmission amount of the light beams is substantially fixed even if the front side working distance WD1 is changed. This enables a satisfactory stereoimage 15a to be formed even when the front side working distance WD1 is varied.

The resolution (MTF) of each lens array plate 3 for 1 Lp is 10% or greater and the MTF change rate of the lens module 2 is greater than 0%/mm and less than or equal to 2%/mm when the rear side working distance WD2 is in the range of 5 to 150 mm, or more preferably, in the range of 5 to 100 mm. This enables the lens module 2 to form the image 15a without blurriness at the position spaced by the rear side working distance WD2 that is in the above range even when the distance WD1 between the lens module 2 (lens array plates 3) and the object 15 is varied. Accordingly, the positional relationship between the lens module 2 and the object 15 can be varied.

Each lens array plate 3 is a flat plate microlens array including the microlenses 3a that are arranged on the two main surfaces of the substrate 4. The microlenses 3a have spherical or non-spherical surfaces. This enables the lens module 2 to form the image 15a without blurriness at a position spaced by the rear side working distance WD2 in the range of 5 to 150 mm even when the distance between each lens array plate 3 formed by the flat plate microlens array and the object 15 is varied.

Each lens array plate 3, which is made of transparent resin, is formed at a low cost. Accordingly, the lens module 2 is formed at a low cost.

At least one lens array plate 3 includes the light shielding film 5 covering the circular peripheries 3b of the outer microlenses 3a. This suppresses stray light generated in the lens array plate 3 and emitted from the lens module 2 toward the image 15a and enables a high-contrast stereoimage to be formed.

Figure 8:
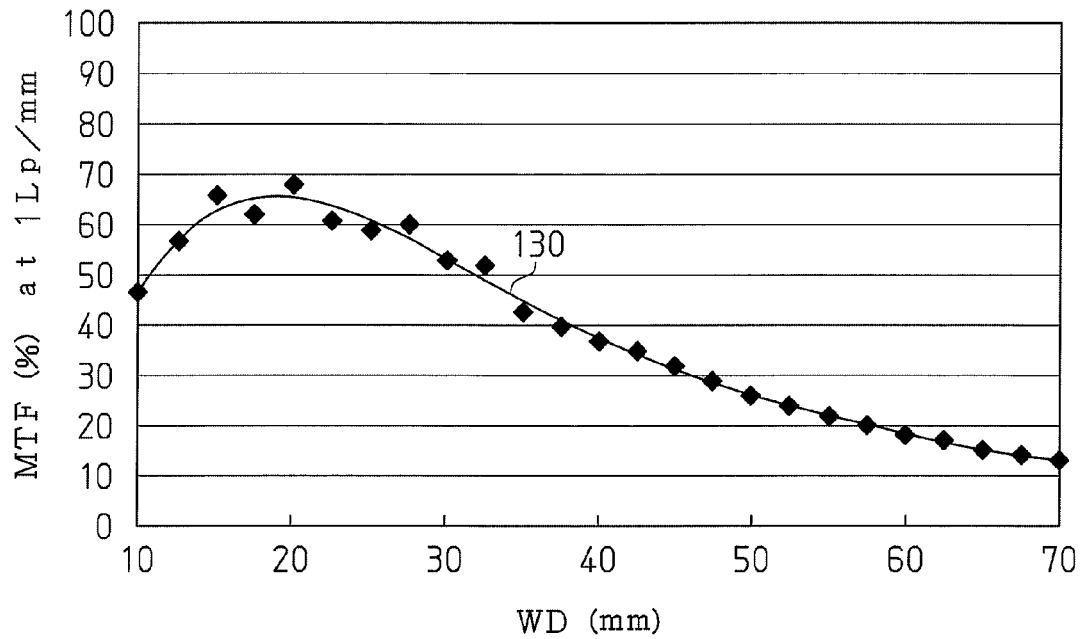
FIG. 8 is a graph showing the relationship between the rear side working distance and the resolution in an erecting unit magnification lens module of example 1.

A lens module 2 of example 1 will now be described with reference to FIG. 8. Curve 130 shows the relationship between the rear side working distance WD2 and the resolution MTF of the lens module 2 of example 1.

In example 1, the resolution MTF of each lens array plate 3 for 1 LP was 10% or greater and the MTF change rate was greater than 0%/mm and less than or equal to 2%/mm when the rear side working distance WD2 was in the range of 10 to 70 mm. The angular aperture of each microlens 3a was 12 degrees. The curvature radius of each microlens 3a was 0.567 mm. The pitch of the microlenses 3a was 0.499 mm. The thickness of each lens array plate 3 (thickness of the substrate 4) was 1.63 mm.

Each lens array plate 3, made of a transparent resin, was formed by injection molded from two molds. Each mold has a plurality of recesses of which layout, curvature, and diameter correspond to the microlenses 3a. Each lens array plate 3 was formed by injecting transparent resin between the two molds. Any transparent resin having properties (transparency, strength, etc.) suitable for the microlenses 3a may be used.

A lens module 2 of example 2 will now be described with reference to FIG. 9.

Figure 9:
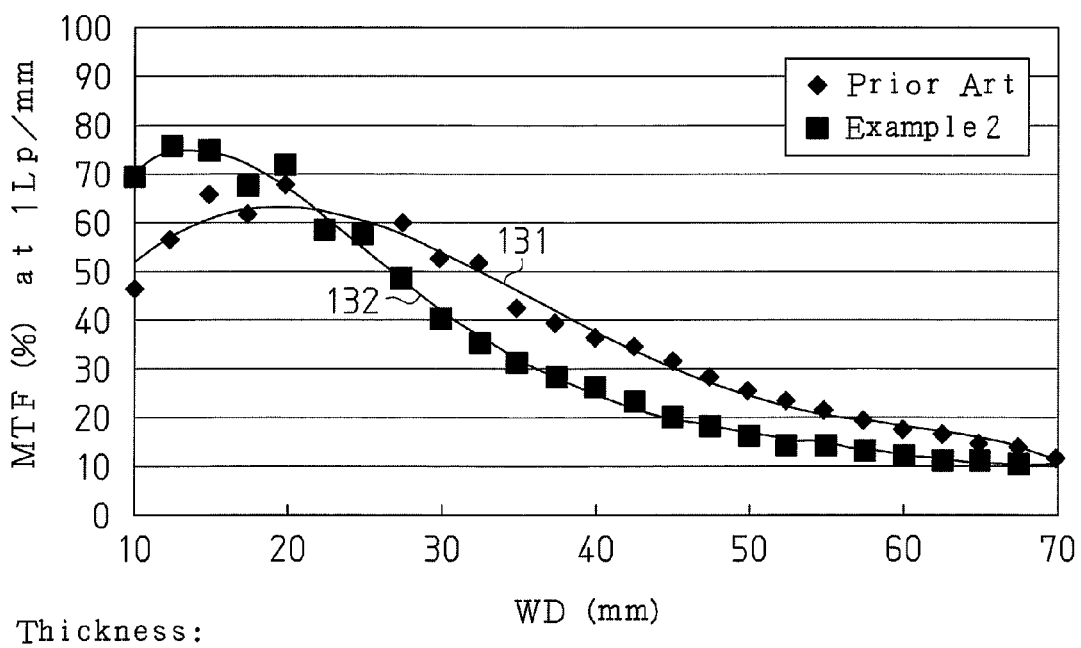
FIG. 9 is a graph showing the relationship between the thickness and the resolution in an erecting unit magnification lens module of the prior art and an erecting unit magnification lens module of example 2.

In FIG. 9, curve 131 shows the relationship between the rear side working distance WD2 and the resolution MTF of the erecting unit magnification lens module in the prior art (refer to FIG. 1), which is used in a scanner or a copier. The erecting unit magnification lens module in the prior art has a plurality of microlenses, with each microlens designed to have a small spherical aberration or a small comatic aberration. The thickness t1 of the lens module, that is, the total thickness of the two lens array plates 103, was 1.69 mm.

In FIG. 9, curve 132 shows the relationship between the rear side working distance WD2 and the resolution MTF of the lens module 2 of example 2. The thickness t of the lens module 2 (refer to FIGS. 3 and 7) was 1.66 mm. The lens module 2 of example 2 was thinner by 30 μm than the lens module in the prior art.

As apparent from curves 131 and 132 in FIG. 9, the lens module 2 of example 2 has lower resolution and forms an image with less noticeable blurriness in the movable range of the lens module 2, that is, in the range of the rear side working distance WD2 (25 to 70 mm). In other words, the lens module 2 of example 2 is designed to form an image with a relatively low resolution even when the front side working distance WD1 is short. Thus, the blurriness of an image goes unnoticed even when the front side working distance WD1 varies.

As compared with the lens module in the prior art, the lens module 2 of example 2 forms an image that is greatly blurred when the distance WD (rear side working distance WD2) is long. However, with the inclination of curve 131 (MTF/WD) being small, the blurriness of an image is less noticeable even when the distance WD varies.

Lens modules 2 of examples 3 and 4 will now be described with reference to FIG. 10. Curves 133 and 134 show the relationship between the rear side working distance WD2 and the resolution MTF of the lens modules 2 of examples 3 and 4.

For the lens module 2 of example 3, the resolution MTF of each lens array plate 3 for 1 LP was 10% or greater and the MTF change rate was greater than 0%/mm and less than or equal to 2%/mm when the rear side working distance WD2 was in the range of 10 to 160 mm.

For the lens module 2 of example 3, the curvature radius of each microlens 3a was 0.576 mm, the thickness of the lens module 2, that is, the total thickness t of the two lens array plates 3, was 1.68 mm, the pitch of the microlenses 3a was 0.499 mm, and the radius of each microlens 3a was 0.3 mm.

For the lens module 2 of example 4, the resolution MTF of each lens array plate 3 for 1 LP was 10% or greater and the MTF change rate was greater than 0%/mm and less than or equal to 2%/mm when the rear side working distance WD2 was in the range of 10 to 90 mm.

For the lens module 2 of example 4, the curvature radius of each microlens 3a was 0.582 mm, the thickness of the lens module 2, that is, the total thickness t of the two lens array plates 3, was 1.68 mm, the pitch of the microlenses 3a was 0.499 mm, and the radius of each microlens 3a was 0.3 mm.

Figure 10:
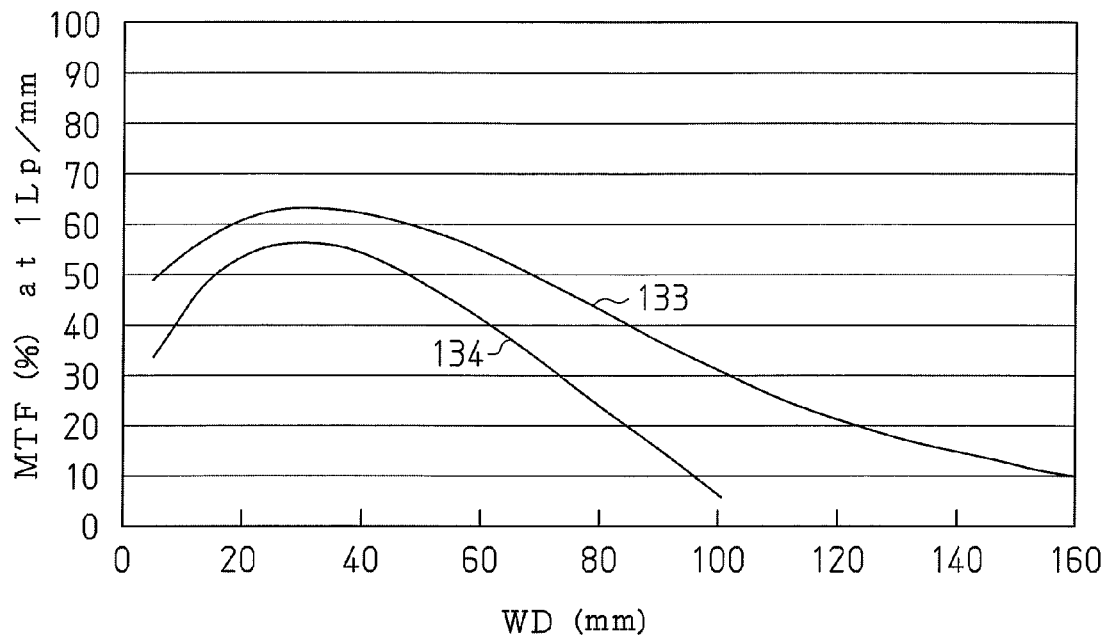
FIG. 10 is a graph showing the relationship between the rear side working distance and the resolution in erecting unit magnification lens modules of examples 3 and 4.

As apparent from curve 133 in FIG. 10, the lens module 2 of example 3 had the resolution MTF of 10% or greater for 1 LP and the resolution MTF varied moderately when the rear side working distance WD2 was in the range of 10 to 160 mm. As apparent from curve 134 in FIG. 10, the lens module 2 of example 4 had the resolution MTF of 10% or greater for 1 LP and the resolution MTF varied more radically than in example 3 when the rear side working distance WD2 was in the range of 10 to 90 mm. The lens module 2 of example 3 is further preferable over the lens module 2 of example 4.

Figure 11:
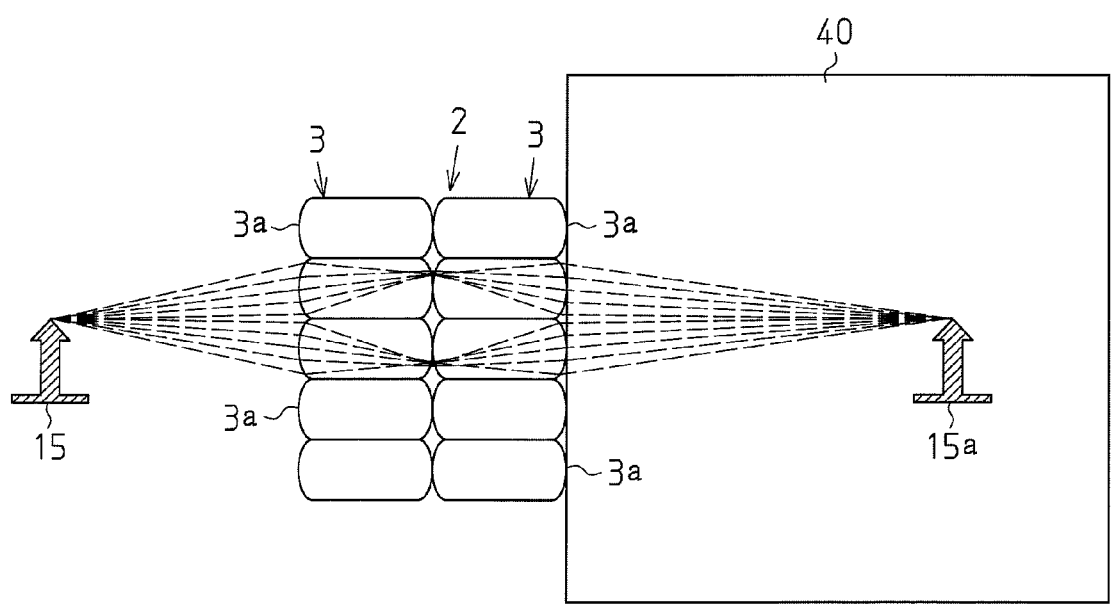
FIG. 11 is a schematic diagram of a stereoimage display apparatus using the erecting unit magnification lens module of the first embodiment.

FIG. 11 shows one example of a stereoimage display apparatus using the lens module 2 of the first embodiment. The stereoimage display apparatus includes a chamber for accommodating a transparent medium 40 and the lens module 2. The lens module 2 forms the image 15a of the object 15 in the medium 40. The image formation distance (rear side working distance WD2) is lengthened in accordance with the refractive index of the medium 40. The medium 40 may be a gas such as air, a liquid such as water, or a solid such as transparent resin. The image formation distance is changed in accordance with the refractive index of the medium 40. For example, when the medium 40 is water, the image formation distance is 1.5 times longer than the image formation distance when the medium 40 is air. In this case, the freedom of design for the positions of the object 15, the microlenses 3a, and the image 15a is greater. The medium 40 is only required to have homogeneity that enables formation of the image 15a. Moreover, as long as the medium 40 enables formation of the image 15a, the medium 40 may be inhomogeneous (for example, partially inhomogeneous).

Figure 12:
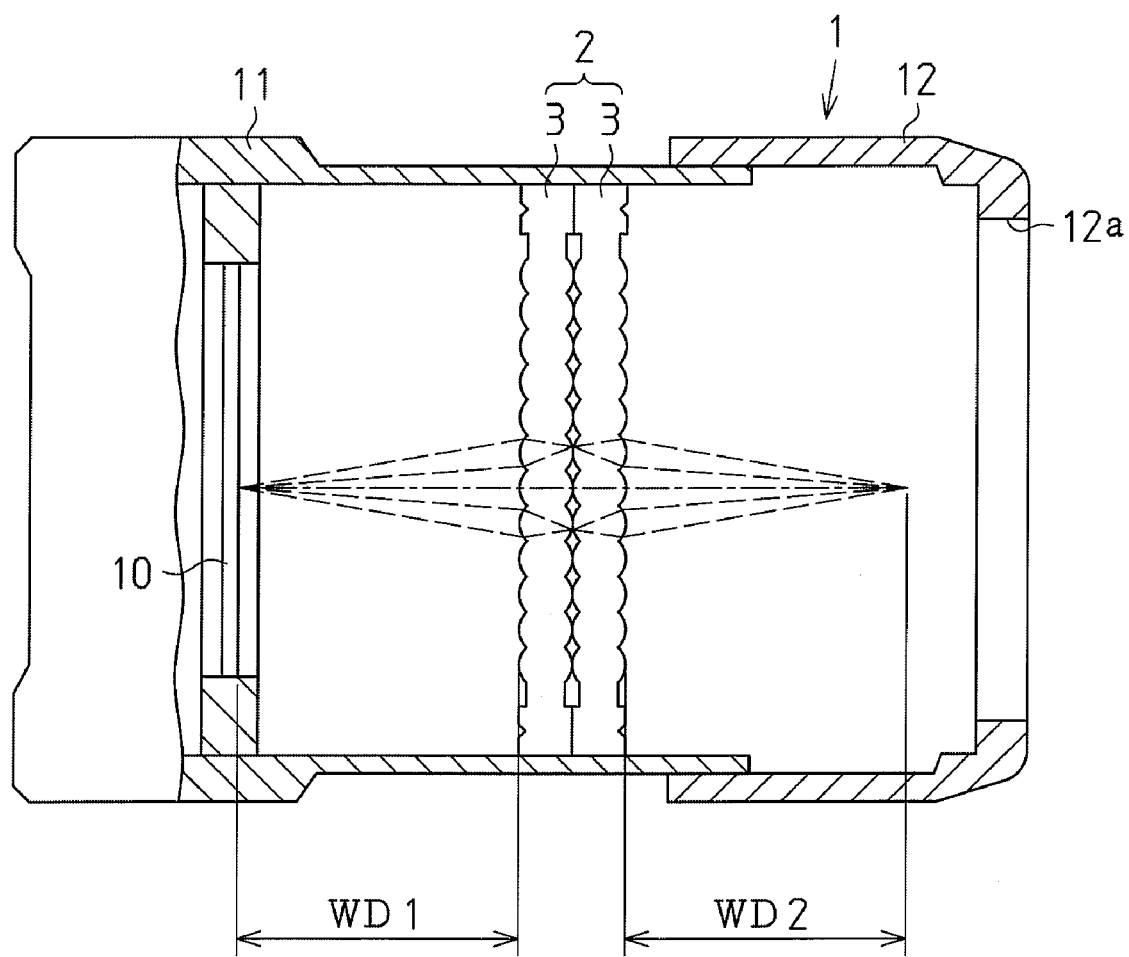
FIG. 12 is a cross-sectional view of the stereoimage display apparatus using the erecting unit magnification lens module of the first embodiment.

The stereoimage display apparatus 1 using the lens module 2 will now be described with reference to FIG. 12. The stereoimage display apparatus 1 is used as, for example, a display for a car navigation system, a display for a cellular phone, an advertising medium, an amusement machine, or the like.

The display apparatus 1 includes the lens module 2, a display device 10 functioning as a display subject object, a basal end housing 11, and a distal end housing 12. The basal end housing 11 and the distal end housing 12 accommodate the lens module 2 and the display device 10. The display device 10 may be, for example, a liquid crystal display. The display device 10 displays an image 15 on its display screen by sequentially providing image signals to a plurality of pixels arranged in a matrix via corresponding switching elements. As shown in FIG. 6, the lens module 2 forms a stereoimage 15a of the image 15 of the display device 10 in a space defined within the distal end housing 12.

The distal end housing 12 is supported by the basal end housing 11 in a manner slidable in the direction of the optical axis. The distal end housing 12 has a window 12a. The stereoimage 15a formed by the lens module 2 is viewable through the window 12a from outside the housing 12. For example, a transparent glass plate is fitted in the window 12a.

The two lens array plates 3 are supported on the inner surface of the basal end housing 11 in a manner movable in the optical axis direction of the microlenses 3a.

The display apparatus 1 has the advantages described below.

The resolution MTF of each lens array plate 3 for 1 LP is 10% or greater and the MTF change rate is greater than 0%/mm and less than or equal to 2%/mm when the rear side working distance WD2 is in the range of 5 to 150 mm. The display apparatus 1 forms the image 15a without blurriness at a position spaced by the rear side working distance WD2 that is in the range of 5 to 150 mm even when the distance between the lens array plates 3 and the display device 10 (object 15) is changed. This enables the distance between the lens array plates 3 and the image 15a to be varied.

The distance between the lens array plates 3 and the image 15a may be changed to vary the extension in depth of the stereoimage. For example, when the lens array plates 3 are moved away from the display device 10, the image 15a formed in the distal end housing 12 is viewed as a floating image by the observer.

The distance between the lens array plates 3 and the display device 10 may be varied by moving both or one of the display device 10 and the lens array plates 3.

The display apparatus 1 forms the stereoimage without blurring it at a position that is spaced by the rear side working distance, which is in the range of 5 to 150 mm, even when the distance between the lens array plates 3 and the display device 10 (object 15) is varied.

The lens array plates 3 are made of a transparent resin that is available at a low cost. Accordingly, the lens array plates 3 are inexpensive.

The display apparatus 1 forms the stereoimage without blurring it even when the distance (front side working distance WD1) between the lens module 2 and the display device 10 is varied. Thus, the display apparatus 1 may vary the extension in depth of the stereoimage by changing the distance between the lens module 2 and the image.

The display apparatus 1 enables the display of a stereoimage in accordance with image signals provided to the display device 10.

Figure 13:
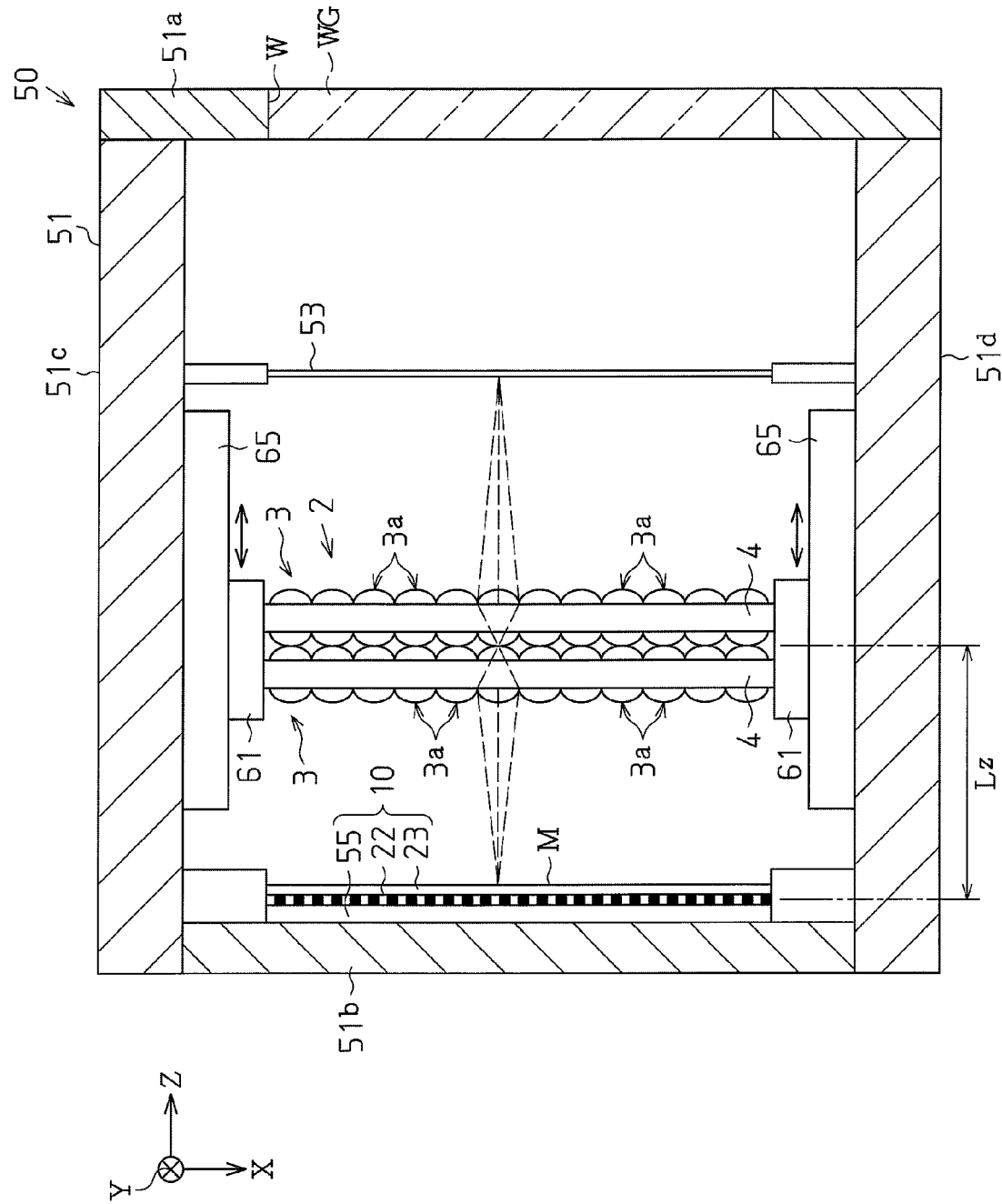
FIG. 13 is a cross-sectional view of a stereoimage display apparatus according to a second embodiment of the present invention.

A stereoimage display apparatus 50 according to a second embodiment of the present invention will now be discussed. As shown in FIG. 13, the stereoimage display apparatus 50 includes a substantially box-shaped case 51. The case 51 includes a front wall 51a having a window W. A transparent glass WG is arranged in the window W. The case 51 accommodates a display device 10, a glass plate 53, and an erecting unit magnification lens module 2.

The display device 10 is fixed to a rear wall 51b of the case 51. The display device 10 may be, for example, a known full color liquid color display. The display device 10 includes a display panel 22, a color filter 23, and a backlight 55.

Figure 14:
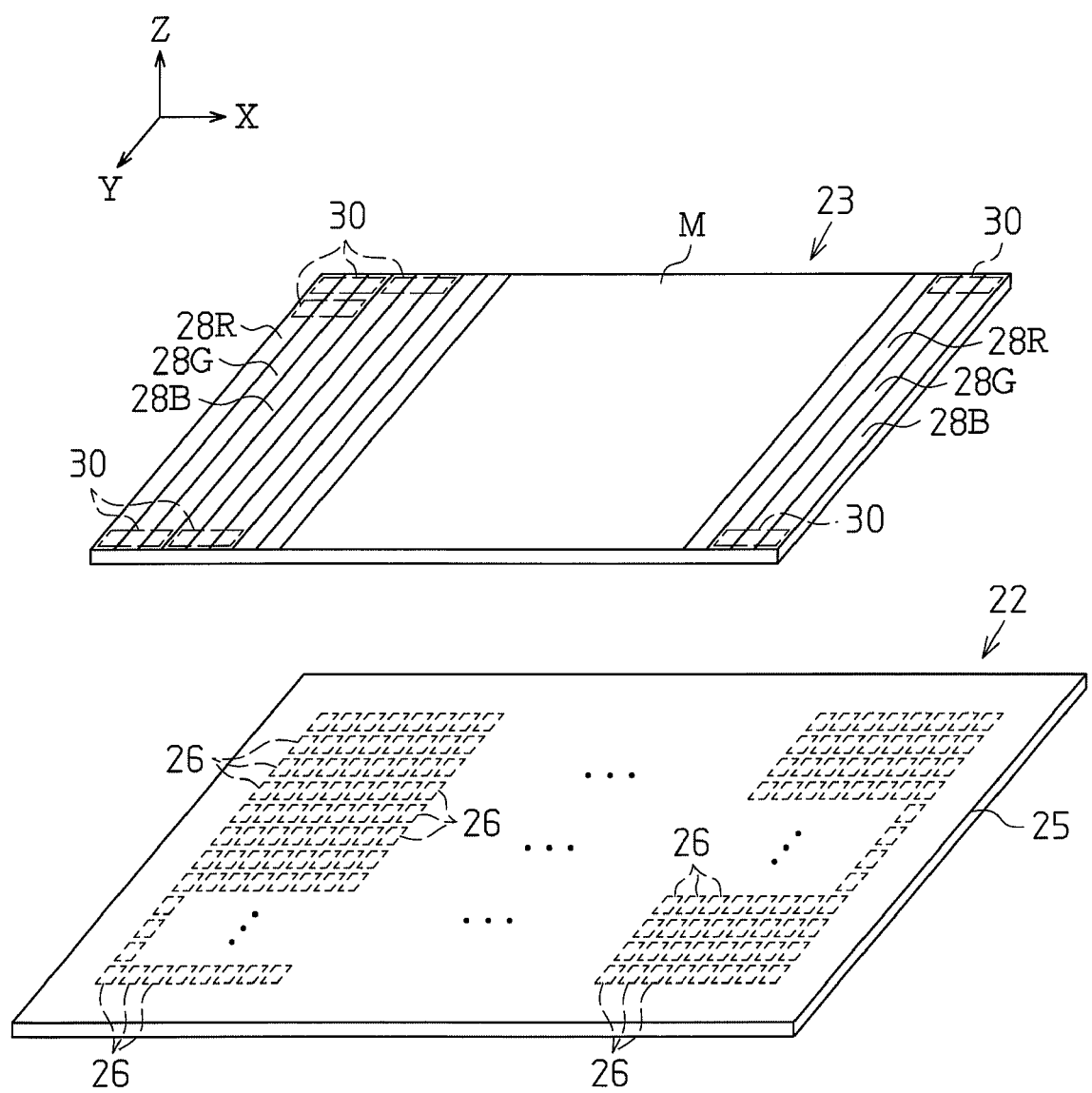
FIG. 14 is an exploded perspective view showing the display device of FIG. 13.

As shown in FIG. 14, the display panel 22 includes a light transmissive substrate 25 (e.g., a glass substrate). A plurality of sub-pixel areas 26 are regularly arranged at a constant interval (in a matrix) on the glass substrate 25.

Each sub-pixel area 26 includes a pixel electrode and various electronic elements that are not shown in the drawings. The pixel electrode in each sub-pixel area 26 is provided with a data signal from an external device (not shown). A common electrode is formed on the glass substrate 25. Liquid crystal is arranged between the common electrode and the pixel electrodes of the sub-pixel areas 26.

When a pixel electrode in one sub-pixel area 26 is provided with a data signal, a potential difference is generated between the pixel electrode and the common electrode in accordance with the data signal. The potential difference controls the orientation of the liquid crystal in that sub-pixel area 26.

Figure 15:
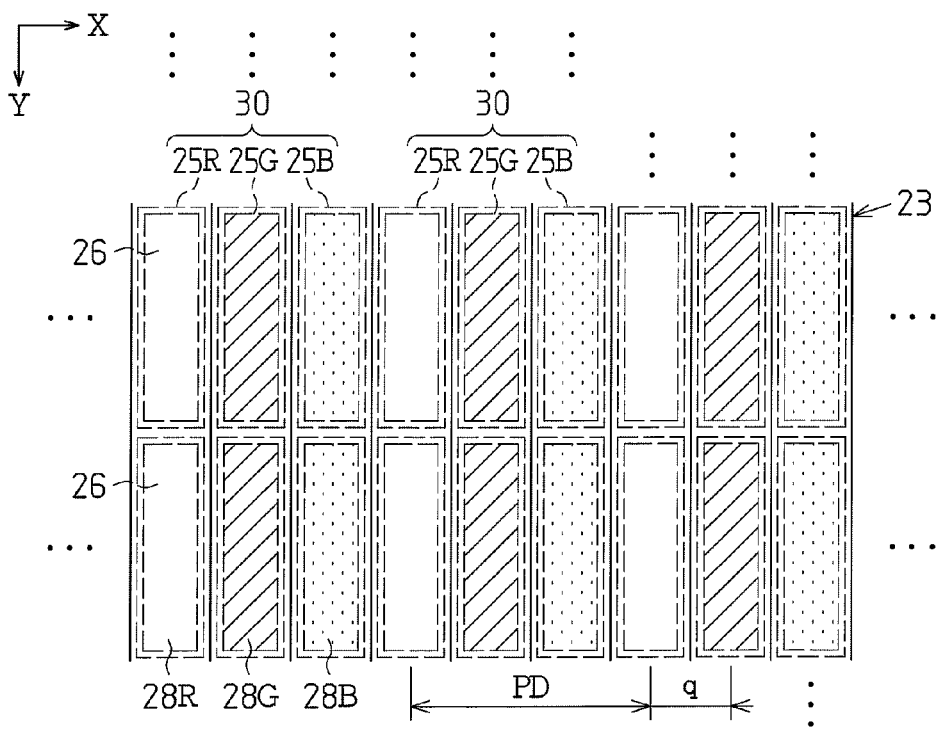
FIG. 15 is an enlarged plan view showing the display device of FIG. 14.

As shown in FIG. 14, the color filter 23 includes red conversion layers 28R, green conversion layers 28G, and blue conversion layers 28B. Each sub-pixel area 26 faces one of the conversion layers 28R, 28G, and 28B. As shown in FIG. 15, the conversion layers 28R, 28G, and 28B are arranged in the X-direction in the order of a red conversion layer 28R, a green conversion layer 28G, a blue conversion layer 28B, a red conversion layer 28R, a green conversion layer 28G, etc. The conversion layers 28R, 28G, and 28B extend in the Y-direction.

As shown in FIG. 15, three sub-pixel areas 26 and the opposing three color conversion layers 28R, 28G, and 28B form three sub-pixels 25R, 25G, and 25B, respectively. The sub-pixels 25R, 25G, and 25B correspond to the three colors of red, green, and blue, respectively. The sub-pixels 25R, 25G, and 25B of the three colors that are adjacent to one another in the X-direction form one pixel 30.

The sub-pixels 25R, 25G, and 25B are arranged at a constant pitch q in the X-direction. The pixels 30 are arranged at a constant pitch PD in X-direction. The sub-pixels 25R, 25G, and 25B are arranged in the Y-direction with each line formed by sub-pixels of the same color. The color filter 23 has vertical stripes formed by lines of the sub-pixels 25R, 25G, and 25B having the same colors.

Referring to FIG. 13, the backlight 55 emits light having wavelengths of a predetermined range toward the display panel 22. The light of the backlight 55 passes through the liquid crystal in the sub-pixel areas 26 formed on the display panel 22. This forms a desired image on a surface of the color filter 23, or on an image display screen M.

The glass plate 53 is fixed to an upper wall 51c and a lower wall 51d of the case 51 so as to face the display device 10. The glass plate 53 is substantially square. The erecting unit magnification lens module 2 is arranged between the glass plate 53 and the display device 10.

Figure 16:
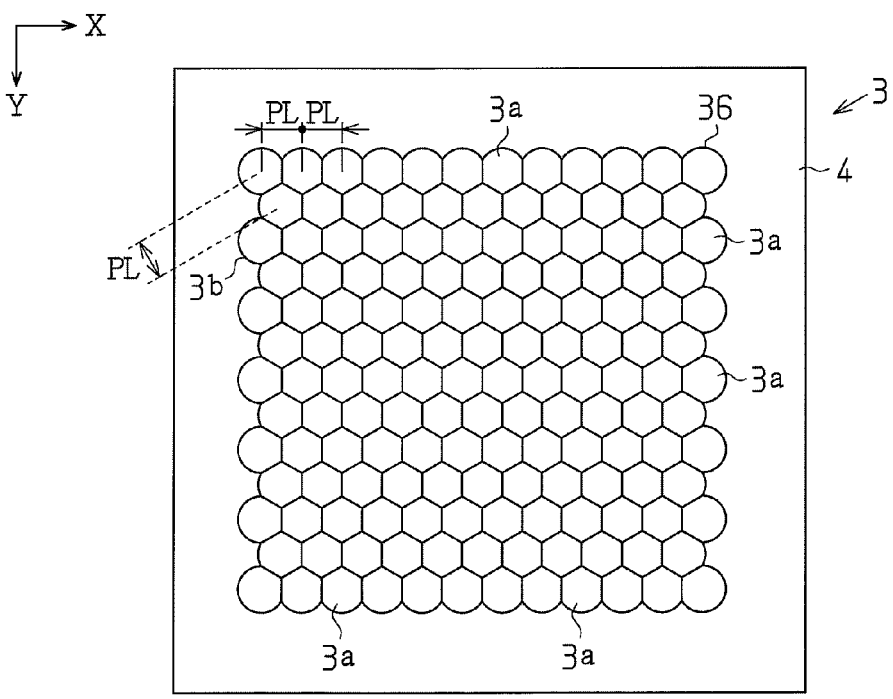
FIG. 16 is a plan view showing the lens array plate of FIG. 14.
Figure 17:
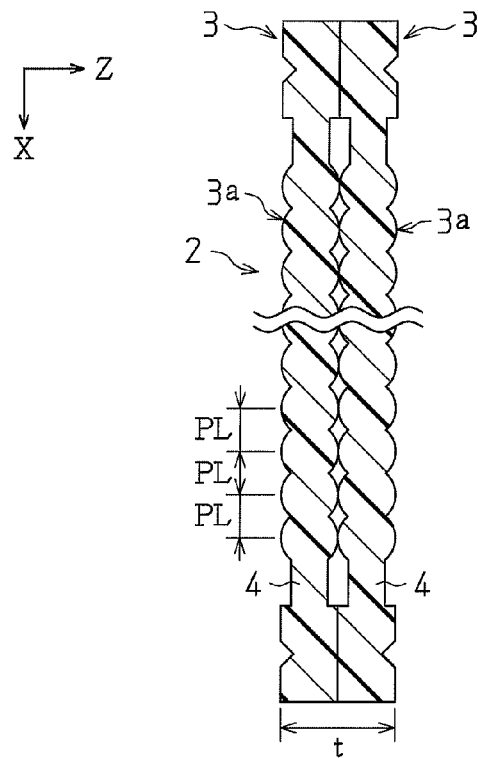
FIG. 17 is a cross-sectional view of the lens array plate of FIG. 13.

The erecting unit magnification lens module 2 forms an erecting unit magnification stereoimage of an object. As shown in FIG. 13, the erecting unit magnification module 2 is formed by integrating two lens array plates 3. The two lens array plates 3 have the same structure. As shown in FIGS. 16 and 17, each lens array plate 3 includes a substrate 4 and a plurality of microlenses 3a. The microlenses 3a have spherical or non-spherical surfaces, and are regularly arranged at constant intervals on the two main surfaces of the substrate 4. The microlenses 3a have the same shapes as those in the first embodiment.

The optical axes of the microlenses 3a are parallel to one another. As shown in FIG. 17, the two lens array plates 3 are integrated so that the peaks of the opposing microlenses 3a come in contact with each other. The microlenses 3a are arranged at a constant pitch PL. The two lens array plates 3 have a thickness t in the optical axis direction. Each lens array plate 3 is made of a transparent resin.

The erecting unit magnification lens module 2 and the display device 10 that are overlapped with each another will now be discussed with reference to FIG. 18.

Figure 18:
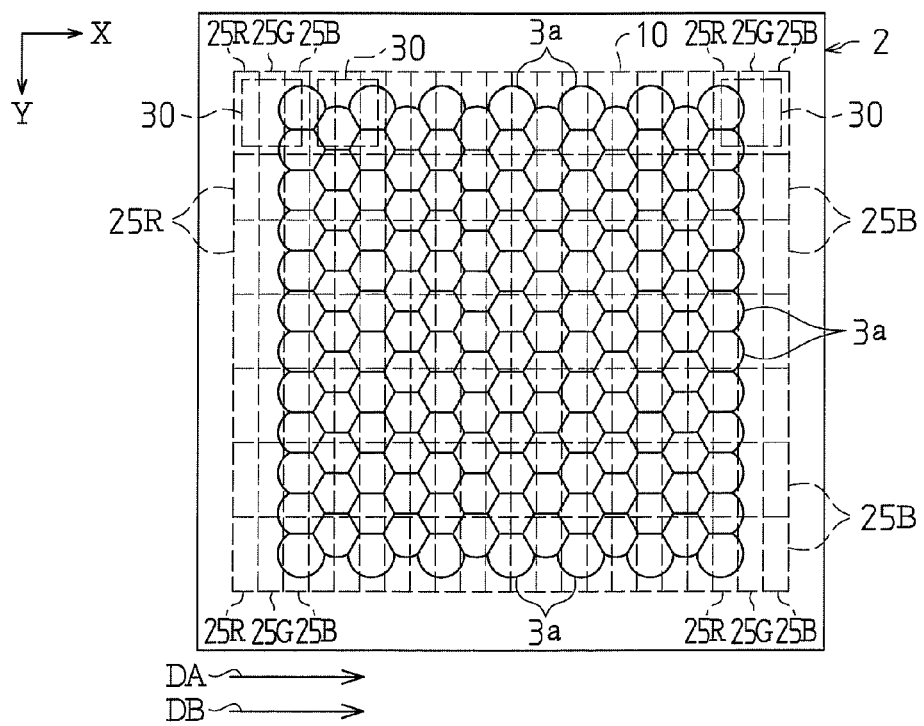
FIG. 18 is a plan view of the erecting unit magnification lens module overlapped with the display device.

The display device 10 has a lateral direction (DA-direction in FIG. 18). The pixels 30 form lines that extend in the DA-direction. The erecting unit magnification lens module 2 has a lateral direction (DB-direction in FIG. 18). The microlenses 3a form lines that extend in a zigzagged manner in DB-direction. The erecting unit magnification lens module 2 and the display device 10 are arranged so that the angle θ between the DA-direction and DB-direction is zero degrees.

As shown in FIG. 13, upper and lower lens fixing stages 61 respectively support the upper and lower ends of the lens array plates 3. Upper and lower moving stages 65 are respectively fixed to upper and lower walls 51c and 51d of the case 51. The upper and lower moving stages 65 support the upper and lower lens fixing stages 61 in a manner enabling movement between the display device 10 and the glass plate 53. The moving stages 65 enable the distance between the lens array plates 3 and the display device 10 and the distance between the lens array plates 3 and the glass plate 53 to be varied.

A direct drive mechanism is used to drive the lens fixing stages 61 and the moving stages 65. One example of the direct drive mechanism is a direct drive screw mechanism. The direct drive screw mechanism includes a screw shaft (drive shaft) attached to the moving stages 65 and extending in the Z-direction, a guide groove accommodating the screw shaft, and a ball nut mated with the screw shaft. The screw shaft is connected to a Z-axis motor, such as a step motor. The Z-axis motor produces forward or reverse rotation in accordance with a drive signal related to a predetermined number of steps. The lens fixing stages 61 are moved relative to the moving stages 65 in the Z-direction by a predetermined movement amount at a predetermined velocity in accordance with the rotation produced by the Z-axis motor. The movement of the lens fixing stages 61 changes the distance Lz (refer to FIG. 13) between the erecting unit magnification lens module 2 and the image display screen M of the display device 10 within a predetermined range.

Figure 1:
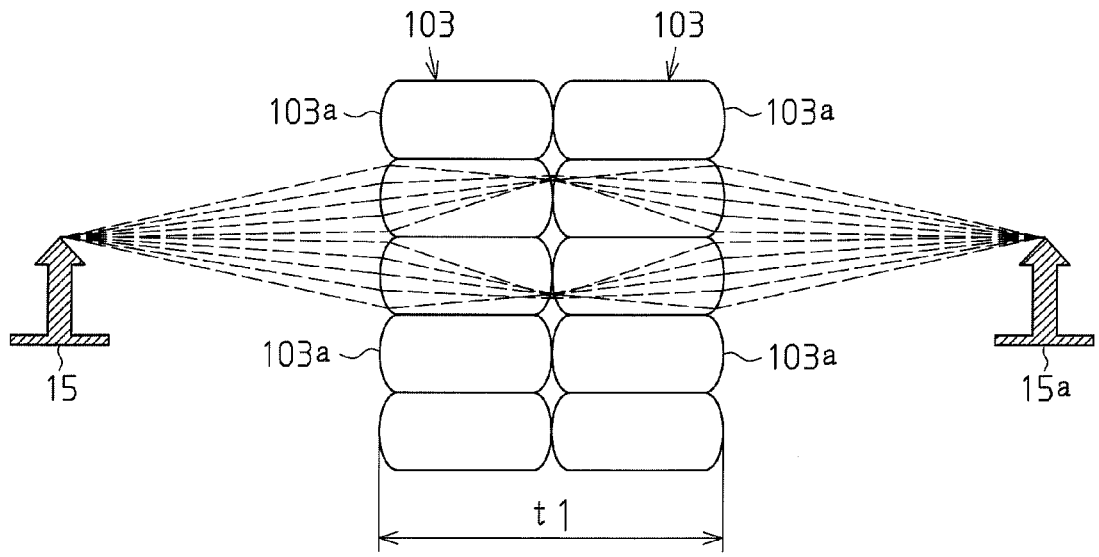
FIG. 1 shows the formation of an image with an erecting unit magnification lens module in the prior art.

The erecting unit magnification lens module 2 will now be described. The lens array plate 3 includes the microlenses 3a each having a desired spherical aberration or a desired comatic aberration. The total thickness t of the two lens array plates 3 is smaller than a designed thickness value (t1: FIG. 1) that minimizes the spherical aberration or comatic aberration of each microlens. The microlenses 3a are formed to have a desired spherical aberration or comatic aberration by forming the erecting unit magnification lens module 2 to be relatively thin.

Light beams from the object 15 pass through proper positions in the lens surfaces of the microlenses 3a that are in accordance with the distance Lz (refer to FIG. 13). As a result, an observer views the inside of the case 51 through the window W, the image shown on the image display screen M of the display device 10 is seen as a floating stereoimage due to binocular disparity.

Figure 19:
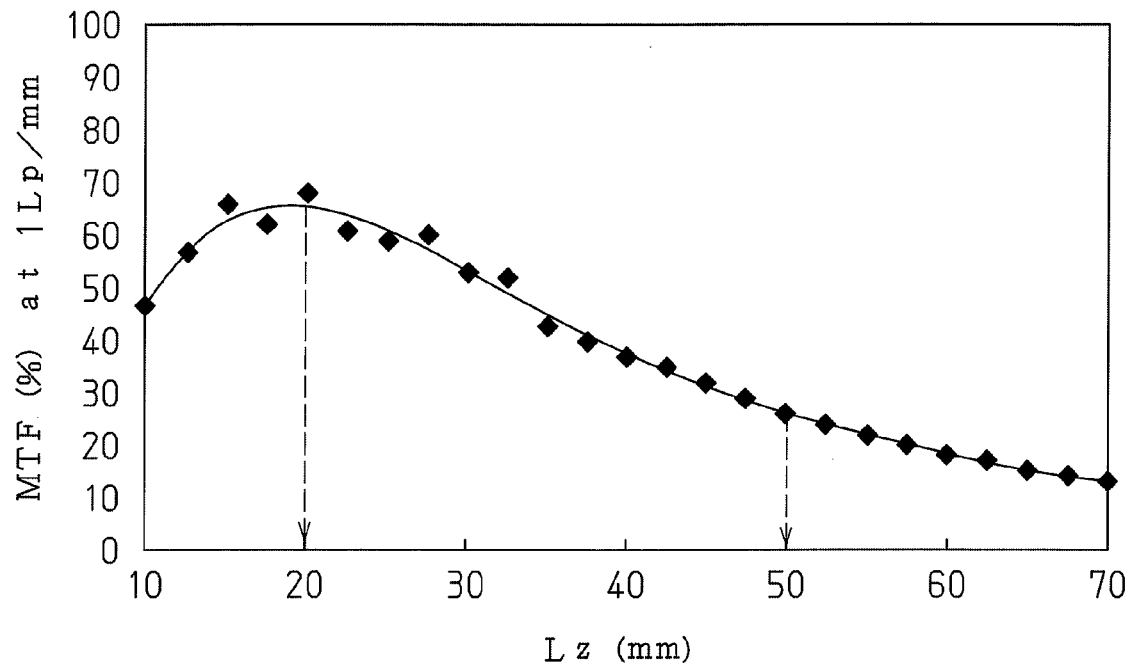
FIG. 19 is a graph showing the relationship between the resolution and the distance Lz between the erecting unit magnification lens module and the image display screen in the erecting unit magnification lens module.

Experiments have been conducted to confirm that the resolution (MTF) of the erecting unit magnification lens module 2 depends on the distance Lz between the erecting unit magnification lens module 2 and the image display screen M of the display device 10. FIG. 19 shows the relationship between the resolution (MTF) of the erecting unit magnification lens module 2 and the distance Lz.

As shown in FIG. 19, the resolution (MTF) of the erecting unit magnification lens module 2 takes a maximum value when the distance Lz is approximately 20 mm. The resolution of the erecting unit magnification lens module 2 gradually decreases as the distance Lz increases or decreases from about 20 mm. In the second embodiment, the position at which the erecting unit magnification lens module 2 is attached to the lens fixing stages 61 and the movable range of the erecting unit magnification lens module 2 are determined so that the resolution of the erecting unit magnification lens module 2 takes a maximum value within the movable range when the resolution (MTF) is maintained at a value of 10% or greater and the distance Lz between the erecting unit magnification lens module 2 and the image display screen M is the minimum value in the movable range. In the example of FIG. 19, the attached positions of the lens fixing stages 61 and the moving stages 65 and the movable range of the erecting unit magnification lens module 2 are determined in a manner that the minimum value of the distance Lz between the erecting unit magnification lens module 2 and the image display screen M is 20 mm.

The second embodiment has the advantages described below.

(1) The erecting unit magnification lens module 2 is arranged at a position facing the image display screen M of the display device 10. When an observer views the inside of the case 51 through the window W, the image shown on the image display screen M of the display device 10 is seen as a floating stereoimage in the case 51.

(2) The erecting unit magnification lens module 2 is arranged on the moving stages 65 by means of the lens fixing stages 61. This enables the distance Lz between the erecting unit magnification lens module 2 and the image display screen M of the display device 10 to be varied within a predetermined range. As a result, the resolution of the erecting unit magnification lens module is varied within a predetermined range by varying the distance Lz. Further, the position of a stereoimage formed in the case 51 may be changed by varying the distance Lz.

(3) The resolution of the erecting unit magnification lens module 2 is lowered by increasing the distance Lz between the erecting unit magnification lens module 2 and the image display screen M of the display device 10. Although this lowers the resolution of the erecting unit magnification lens module 2, the lowered resolution is maintained to have at least a certain level that enables the human eyes to see an image that is not blurred. With this structure, even if moire fringes are generated, the lowered resolution of the erecting unit magnification lens module 2 lightens the moire fringes. The moire fringes are therefore less noticeable. As a result, the shown stereoimage has high-quality in which an observer substantially does not see moire fringes.

(4) The erecting unit magnification lens module 2 is arranged in a manner that the resolution (MTF) of the erecting unit magnification lens module 2 is maintained at a value of at least 10% and the resolution of the erecting unit magnification lens module 2 takes the maximum value within the movable range when the distance Lz between the erecting unit magnification lens module 2 and the image display screen M is the minimum within the movable range. As a result, the resolution of the erecting unit magnification lens module 2 is varied within the range in which the resolution MTF for 1 LP is 10% or greater by varying the distance between the image display screen M and the erecting unit magnification lens module 2. As a result, a clear stereoimage is seen by the human eyes throughout the range in which movement of the erecting unit magnification lens module 2 relative to the image display screen is enabled.

(5) The display device 10 has the pixels 30 that are in a vertical stripe arrangement. The erecting unit magnification lens module 2 has the microlenses 3*a* that are in a hexagonal arrangement. The erecting unit magnification lens module 2 forms a stereoimage of an image shown by the display device 10, which has the pixels 30 that are in a vertical stripe arrangement, with reduced moire fringes.

(6) Each pixel 30 includes the sub-pixels 25R, 25G, and 25B of the three colors that are arranged at constant intervals on the glass substrate 25. The sub-pixels 25R, 25G, and 25B are arranged in the vertical direction of the glass substrate 25 to form lines of the same colors. This structure enables a known full color liquid crystal display to be used as the display device 10 and enables the stereoimage display apparatus 50 to be manufactured at a low cost.

A stereoimage display apparatus 50 according to a third embodiment of the present invention will now be described with reference to FIG. 20. The stereoimage display apparatus 50 of the third embodiment differs from the second embodiment in that microlenses 3*a* of an erecting unit magnification lens module 2 are arranged at a corrected lens pitch PLo.

In the example of FIG. 19, the resolution (MTF) of the erecting unit magnification lens module 2 is the highest when the distance Lz between the erecting unit magnification lens module 2 and the image display screen M takes the minimum value within the movable range. In this state, moire fringes generated in a stereoimage are most noticeable to the human eyes. In the third embodiment, the erecting unit magnification lens module 2 has a lens pitch PLo that is corrected based on the ratio of the distance LA between the viewpoint of the observer and the image display screen M of the display device 10 and the distance Lz between the erecting unit magnification lens module 2 and the image display screen M.

Figure 20:
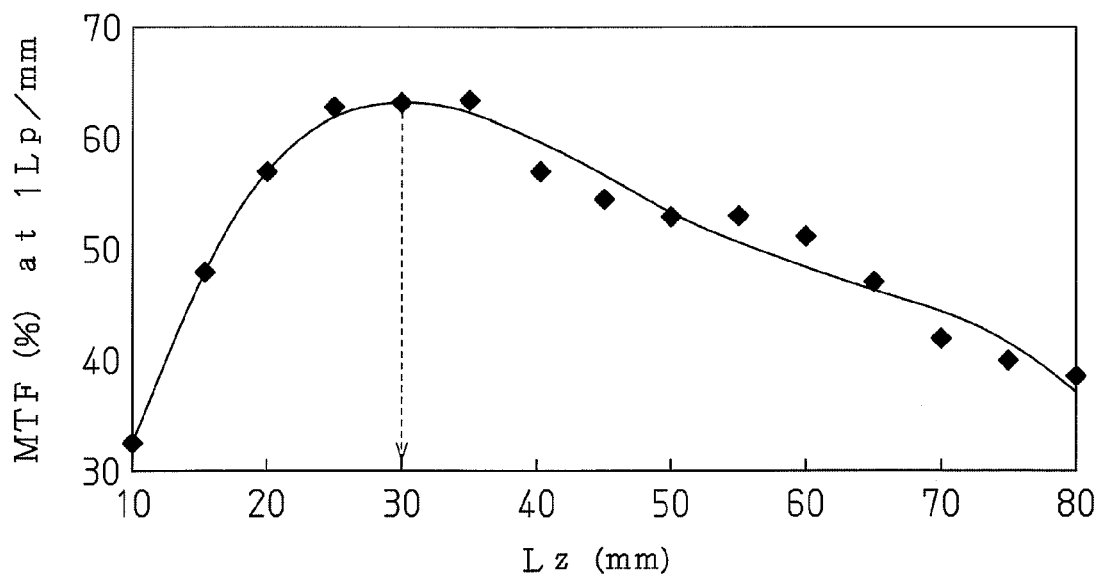
FIG. 20 is a diagram showing a stereoimage formation apparatus according to a third embodiment of the present invention.

In the example of FIG. 20, when the distance Lz between the erecting unit magnification lens module 2 and the image display screen M takes the minimum value within the movable range, the ratio of the corrected lens pitch PL to the lens pitch PL of the erecting unit magnification lens module 2 (PLo/PD) satisfies the expression shown below.

$(1.20+n*1.50) \leq PLo/PD \leq (1.70+n*1.50)$, (where n=0, 1, 2, 3, ... )

The corrected lens pitch PLo is expressed by the expression shown below.

$PLo = PL/a$

The constant a is defined by the expression shown below.

$a = \{LA-(L+Z/2)\}/\{LA-(2L+Z)\}$

The corrected lens pitch PLo is set in a manner that the ratio PLo/PD satisfies the above expression when the distance Lz between the image display screen M and the erecting unit magnification lens module 2 takes the minimum value. This sufficiently narrows the intervals of moire fringes generated in a stereoimage.

The third embodiment has the advantages described below.

The lens pitch PL of the erecting unit magnification lens module 2 is corrected based on the ratio of the distance LA between the viewpoint of the observer and the image display screen M of the display device 10 and the distance Lz between the erecting unit magnification lens module 2 and the image display screen M. This correction sufficiently narrows the intervals of moire fringes generated in a stereoimage. Such moire fringes are less noticeable. As a result, the stereoimage display apparatus displays a high-quality stereoimage throughout the range in which the distance Lz between the image display screen M and the erecting unit magnification lens module 2 is variable.

Examples of the third embodiment will now be described.

Example 5

Table 1 shows the resolution and the stereoimage quality of a stereoimage display apparatus 50 of example 5.

TABLE 1

| Observer Position LA (mm) | 500 | | |
|---|---|---|---|
| Pixel Interval PD (mm) | 0.321 | | |
| Distance Lz (mm) | 20 | 45 | 70 |
| Lens Interval PL (mm) | 0.499 | 0.499 | 0.499 |
| Corrected Lens Interval PLo (mm) | 0.476 | 0.448 | 0.415 |
| Resolution (%) | 65 | 30 | 12 |
| Ratio (PLo/PD) | 1.48 | 1.39 | 1.29 |
| Angle | 0 | 0 | 0 |
| Image Quality | Exc. | Exc. | Exc. |

In example 5, a full color liquid crystal display (99 mm*132 mm) having a diagonal screen size of 6.5 inches and a pixel pitch PD of 0.321 mm*0.321 mm (sub-pixel pitch q of 0.321 mm*0.107 mm) with a vertical stripe arrangement in which pixels of the same colors are continuously arranged in the vertical direction was used as the display device 10. In example 5, the erecting unit magnification lens module 2 has a diagonal screen size of 6.5 inches and includes the microlenses 3*a* having a focal distance of 20 mm, a lens thickness t of 1.66 mm, and a lens pitch PL of 0.499 mm. Each microlens 3*a* is hexagonal. The microlenses 3*a* are in a hexagonal arrangement.

When the distance LA between the observer and the image display screen M of the display device 10 was 500 mm and the distance Lz between the image display screen M and the erecting unit magnification lens module 2 was 20 mm, the corrected lens pitch PLo was 0.476 mm. In this case, the ratio of the corrected lens pitch PLo and the pixel pitch PD of the display device 10 was 1.48. Further, the resolution was 65%. In this case, moire fringes were not observed in the stereoimage with the naked eye.

When the distance Lz between the image display screen M and the erecting unit magnification lens module 2 was increased to 45 mm, the corrected lens pitch PLo was 0.448 mm. In this case, the ratio of the corrected lens pitch PLo and the pixel pitch PD of the display device 10 was 1.39. Further, the resolution was 30%. In this case, moire fringes were not observed in the stereoimage with the naked eye.

When the distance Lz between the image display screen M and the erecting unit magnification lens module 2 was increased to 70 mm, the corrected lens pitch PLo was 0.415 mm. In this case, the ratio of the corrected lens pitch PLo and the pixel pitch PD of the display device 10 was 1.29. Further, the resolution was 12%. In this case, moire fringes were not observed in the stereoimage formed in the case 51 with the naked eye.

Comparative Example

Table 2 shows the resolution and the stereoimage quality of a stereoimage display apparatus of a comparative example.

TABLE 2

| Observer Position LA (mm) | 500 | | | |
|---|---|---|---|---|
| Pixel Interval PD (mm) | 0.255 | | | |
| Distance Lz (mm) | 20 | 40 | 60 | 80 |
| Lens Interval PL (mm) | 0.499 | 0.499 | 0.499 | 0.499 |
| Corrected Lens Interval PLo (mm) | 0.476 | 0.454 | 0.429 | 0.402 |
| Resolution (%) | 65 | 38 | 19 | 11 |
| Ratio (PLo/PD) | 1.87 | 1.68 | 1.68 | 1.58 |
| Angle | 0 | 0 | 0 | 0 |
| Image Quality | NG | NG | NG | Good |

In the comparative example, a full color liquid crystal display (229 mm*305 mm) having a diagonal screen size of 15 inches and a pixel pitch PD of 0.255 mm*0.255 mm (sub-pixel pitch q of 0.255 mm*0.099 mm) with a vertical stripe arrangement in which pixels of the same colors are continuously arranged in the vertical direction was used as the display device 10. In the comparative example, the erecting unit magnification lens module 2 of example 5 was used.

When the distance LA between the observer and the image display screen M of the display device 10 was 500 mm and the distance Lz between the image display screen M and the erecting unit magnification lens module 2 was 20 mm, the corrected lens pitch PLo was 0.476 mm. In this case, the ratio of the corrected lens pitch PLo and the pixel pitch PD of the display device 10 was 1.87. Further, the resolution was 65%. In this case, moire fringes were clearly observed in a stereoimage formed in the case 51.

When the distance Lz between the image display screen M and the erecting unit magnification lens module 2 was increased to 40 mm, the corrected lens pitch PLo was 0.454 mm. In this case, the ratio of the corrected lens pitch PLo and the pixel pitch PD of the display device 10 was 1.68. Further, the resolution was 38%. In this case, moire fringes were clearly observed in a stereoimage formed in the case 51.

When the distance Lz between the image display screen M and the erecting unit magnification lens module 2 was increased to 60 mm, the corrected lens pitch PLo was 0.429 mm. In this case, the ratio of the corrected lens pitch PLo and the pixel pitch PD of the display device 10 was 1.68. Further, the resolution was 19%. In this case, moire fringes were clearly observed in a stereoimage formed in the case 51.

Further, when the distance Lz between the image display screen M and the erecting unit magnification lens module 2 was increased to 80 mm, the corrected lens pitch PLo was 0.402 mm. In this case, the ratio of the corrected lens pitch PLo and the pixel pitch PD of the display device 10 was 1.58. Further, the resolution was 11%. In this case, although moire fringes were generated in a stereoimage formed in the case 51, the moire fringes were too fine to be observed with the naked eye.

Example 6

Table 3 shows the resolution and the stereoimage quality of a stereoimage display apparatus 50 of example 6.

TABLE 3

| Observer Position LA (mm) | 500 | | | |
|---|---|---|---|---|
| Pixel Interval PD (mm) | 0.297 | | | |
| Distance Lz (mm) | 20 | 40 | 60 | 80 |
| Lens Interval PL (mm) | 0.499 | 0.499 | 0.499 | 0.499 |
| Corrected Lens Interval PLo (mm) | 0.476 | 0.454 | 0.429 | 0.402 |
| Resolution (%) | 65 | 38 | 19 | 11 |
| Ratio (PLo/PD) | 1.6 | 1.53 | 1.44 | 1.35 |
| Angle | 0 | 0 | 0 | 0 |
| Image Quality | NG | Good | Exc. | Exc. |

In example 6, a full color liquid crystal display (305 mm*407 mm) having a diagonal screen size of 20 inches and a pixel pitch PD of 0.297 mm*0.297 mm (sub-pixel pitch q of 0.297 mm*0.085 mm) with a vertical stripe arrangement in which pixels of the same colors are continuously arranged in the vertical direction was used as the display device 10. In example 6, the erecting unit magnification lens module 2 of example 5 was used.

When the distance LA between the observer and the image display screen M of the display device 10 was 500 mm and the distance Lz between the image display screen M and the erecting unit magnification lens module 2 was 20 mm, the corrected lens pitch PLo was 0.476 mm. In this case, the ratio of the corrected lens pitch PLo and the pixel pitch PD of the display device 10 was 1.60. Further, the resolution was 65%. In this case, moire fringes were clearly observed in a stereoimage formed in the case 51.

When the distance Lz between the image display screen M and the erecting unit magnification lens module 2 was increased to 40 mm, the corrected lens pitch PLo was 0.454 mm. In this case, the ratio of the corrected lens pitch PLo and the pixel pitch PD of the display device 10 was 1.53. Further, the resolution was 38%. In this case, although moire fringes were generated in a stereoimage formed in the case 51, the moire fringes were too fine to be observed with the naked eye.

When the distance Lz between the image display screen M and the erecting unit magnification lens module 2 was increased to 60 mm, the corrected lens pitch PLo was 0.429 mm. In this case, the ratio of the corrected lens pitch PLo and the pixel pitch PD of the display device 10 was 1.44. Further, the resolution was 19%. In this case, moire fringes were not observed with the naked eye in a stereoimage formed in the case 51.

Further, when the distance Lz between the image display screen M and the erecting unit magnification lens module 2 was increased to 80 mm, the corrected lens pitch PLo was 0.402 mm. In this case, the ratio of the corrected lens pitch PLo and the pixel pitch PD of the display device 10 was 1.35. Further, the resolution was 11%. In this case, moire fringes were not observed with the naked eye in a stereoimage formed in the case 51.

Tables 4 and 5 show the resolution and the stereoimage quality of a stereoimage display apparatus 50 of example 7.

TABLE 4

| Distance Lz (mm) | 30 | | | | | | | | |
|---|---|---|---|---|---|---|---|---|---|
| Observer Position LA (mm) | 500 | | | | | | | | |
| Pixel Interval PD (mm) | 0.297 | 0.297 | 0.255 | 0.321 | 0.255 | 0.297 | 0.297 | 0.255 | 0.255 |
| Lens Interval PL (mm) | 0.38 | 0.41 | 0.38 | 0.499 | 0.41 | 0.499 | 0.55 | 0.499 | 0.55 |
| Ratio (PLo/PD) | 1.19 | 1.29 | 1.39 | 1.45 | 1.5 | 1.57 | 1.73 | 1.82 | 2.01 |
| Image Quality | NG | Good | Exc. | Exc. | Exc. | Good | NG | NG | NG |

TABLE 5

| Distance Lz (mm) | 30 | | | | | |
|---|---|---|---|---|---|---|
| Observer Position LA (mm) | 500 | | | | | |
| Pixel Interval PD (mm) | 0.297 | 0.264 | 0.264 | 0.255 | 0.255 | 0.255 |
| Lens Interval PL (mm) | 0.85 | 0.8 | 0.85 | 0.85 | 0.9 | 0.95 |
| Ratio (PLo/PD) | 2.67 | 2.83 | 3 | 3.11 | 3.29 | 3.47 |
| Image Quality | NG | Good | Exc. | Good | Good | NG |

Figure 21:
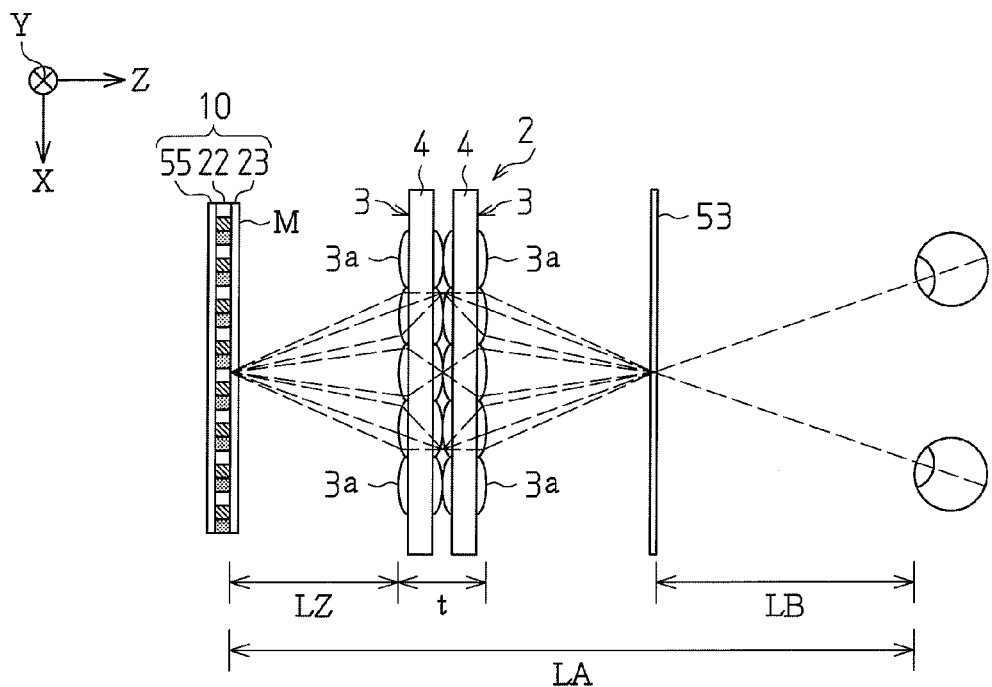
FIG. 21 is a diagram showing a stereoimage formation apparatus according to a fourth embodiment of the present invention.

In example 7, the resolution (MTF) of the erecting unit magnification lens module 2 and the distance Lz have the relationship as shown in FIG. 21. More specifically, the resolution (MTF) of the erecting unit magnification lens module 2 takes the maximum value when the distance Lz is about 30 mm and gradually decreases as the distance Lz either increases or decreases from about 30 mm.

As shown in Tables 4 and 5, when the distance LA between the observer and the image display screen M of the display device 10 was 500 mm and the distance Lz between the image display screen M and the erecting unit magnification lens module 2 was 30 mm, the ratio of the corrected lens pitch PLo and the pixel pitch PD of the display device 10 was set at 1.19 by setting the pixel pitch PD at 0.297 mm and the lens pitch PL at 0.38 mm. In this case, moire fringes were clearly observed in a stereoimage formed in the case 51.

The ratio of the corrected lens pitch PLo and the pixel pitch PD of the display device 10 was set at 1.29 by setting the pixel pitch PD at 0.297 mm and the lens pitch PL at 0.41 mm. In this case, although moire fringes were generated in a stereoimage formed in the case 51, the moire fringes were too fine to be observed with the naked eye.

The ratio of the corrected lens pitch PLo and the pixel pitch PD of the display device 10 was set at 1.39 by setting the pixel pitch PD at 0.255 mm and the lens pitch PL at 0.38 mm. In this case, moire fringes were not observed with the naked eye in a stereoimage formed in the case 51.

The ratio of the corrected lens pitch PLo and the pixel pitch PD of the display device 10 was set at 1.45 by setting the pixel pitch PD at 0.321 mm and the lens pitch PL at 0.499 mm. In this case, moire fringes were not observed with the naked eye in a stereoimage formed in the case 51.

The ratio of the corrected lens pitch PLo and the pixel pitch PD of the display device 10 was set at 1.50 by setting the pixel pitch PD at 0.255 mm and the lens pitch PL at 0.41 mm. In this case, although moire fringes were generated in a stereoimage formed in the case 51, the moire fringes were too fine to be observed with the naked eye.

The ratio of the corrected lens pitch PLo and the pixel pitch PD of the display device 10 was set at 1.73 by setting the pixel pitch PD at 0.297 mm and the lens pitch PL at 0.55 mm. In this case, moire fringes were clearly observed in a stereoimage formed in the case 51.

The ratio of the corrected lens pitch PLo and the pixel pitch PD of the display device 10 was set at 1.82 by setting the pixel pitch PD at 0.255 mm and the lens pitch PL at 0.499 mm. In this case, moire fringes were clearly observed in a stereoimage formed in the case 51.

The ratio of the corrected lens pitch PLo and the pixel pitch PD of the display device 10 was set at 2.01 by setting the pixel pitch PD at 0.255 mm and the lens pitch PL at 0.55 mm. In this case, moire fringes were clearly observed in a stereoimage formed in the case 51.

The ratio of the corrected lens pitch PLo and the pixel pitch PD of the display device 10 was set at 2.67 by setting the pixel pitch PD at 0.297 mm and the lens pitch PL at 0.85 mm. In this case, moire fringes were clearly observed in a stereoimage formed in the case 51.

The ratio of the corrected lens pitch PLo and the pixel pitch PD of the display device 10 was set at 2.83 by setting the pixel pitch PD at 0.264 mm and the lens pitch PL at 0.8 mm. In this case, although moire fringes were generated in a stereoimage formed in the case 51, the moire fringes were too fine to be observed with the naked eye.

The ratio of the corrected lens pitch PLo and the pixel pitch PD of the display device 10 was set at 3.00 by setting the pixel pitch PD at 0.264 mm and the lens pitch PL at 0.85 mm. In this case, moire fringes were not observed in a stereoimage formed in the case 51.

The ratio of the corrected lens pitch PLo and the pixel pitch PD of the display device 10 was set at 3.11 by setting the pixel pitch PD at 0.255 mm and the lens pitch PL at 0.85 mm. In this case, although moire fringes were generated in a stereoimage formed in the case 51, the moire fringes were too fine to be observed with the naked eye.

The ratio of the corrected lens pitch PLo and the pixel pitch PD of the display device 10 was set at 3.29 by setting the pixel pitch PD at 0.255 mm and the lens pitch PL at 0.9 mm. In this case, although moire fringes were generated in a stereoimage formed in the case 51, the moire fringes were too fine to be observed with the naked eye.

The ratio of the corrected lens pitch PLo and the pixel pitch PD of the display device 10 was set at 3.47 by setting the pixel pitch PD at 0.255 mm and the lens pitch PL at 0.95 mm. In this case, moire fringes were clearly observed in a stereoimage formed in the case 51.

In Tables 1 to 5, "Exc." indicates that the image has maximum quality and no moire fringes were generated in the image, "Good" indicates that the image has a high quality and moire fringes generated in the image were too fine to be observed with the naked eye, and "NG" indicates that the image has a low quality and moire fringes generated in the image were clearly observed.

A stereoimage display apparatus 50 according to a fourth embodiment of the present invention will now be described with reference to FIG. 22. The stereoimage display apparatus 50 of the fourth embodiment differs from the second embodiment only in the arrangement of the erecting unit magnification lens module 2 and the display device 10.

Figure 22:
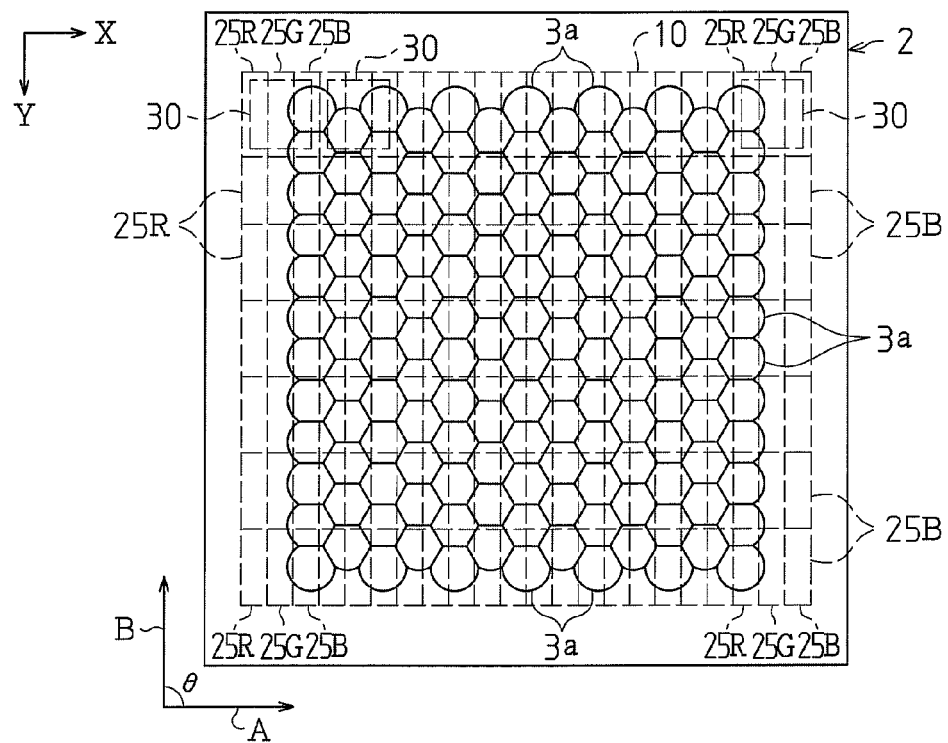
FIG. 22 is a plan view of a modification.

Referring to FIG. 22, the lateral direction (DA) of the display device 10 is inclined relative to the lateral direction (DB) of the erecting unit magnification lens module 2. The angle θ between the arrows DA and DB is 90 degrees.

With the angle θ being 90 degrees, the arrangement pattern of the pixels 30 of the display device 10 (liquid crystal display) and the arrangement pattern of the microlenses 3a of the erecting unit magnification lens module 2 do not interfere with each other.

Inclination of the erecting unit magnification lens module 2 corrects the corrected lens pitch PLo by a greater amount. The second corrected lens pitch PLoa is determined to satisfy the following expression.

$$(1.20 + n*1.50) \leq PLoa/PD \leq (1.70 + n*1.50),$$

where n=0, 1, 2, 3, . . .

The second corrected lens pitch PLoa and the corrected lens pitch PLo satisfy the following expressions.

$$PLoa(x) = \cos\theta * PLo(x)$$

$$PLoa(y) = PLo(y)/\cos\theta$$

The corrected lens pitch PLo(x) is the corrected lens pitch in the X-direction, and the corrected lens pitch PLo(y) is the corrected lens pitch in the Y-direction.

When the erecting unit magnification lens module 2 has a hexagonal arrangement of pixels, PLo(x) and PLo(y) satisfy the following relationship.

$$PLo(y) = \sqrt{2} \times PLo(x)/3$$

(where $-30° \leq \theta - (60°*n) \leq 30°$; n is an integer)

When the erecting unit magnification lens module 2 has a square arrangement of pixels, PLo(x) and PLo(y) satisfy the following relationship.

$$PLo(y) = PLo(x),$$

where $-45° \leq \theta - (90°*n) \leq 45°$; n is an integer.

The fourth embodiment has the advantages described below.

The angle θ between the lateral direction (DA) of the display device 10 and the lateral direction (DB) of the erecting unit magnification lens module 2 is 90 degrees. In this case, the sides of the arrangement pattern of the microlenses 3a do not extend in the same direction as the sides of the arrangement pattern of the pixels 30. The arrangement pattern of the pixels 30 of the display device 10 and the arrangement pattern of the microlenses 3a of the erecting unit magnification lens module 2 do not interfere with each other. This further reduces moire fringes and enables a stereoimage with a higher quality to be displayed.

In the fourth embodiment, the angle θ between the lateral direction (DA) of the display device 10 and the lateral direction (DB) of the erecting unit magnification lens module 2 may be an angle other than 90 degrees. Even in such a case, the sides of the arrangement pattern of the microlenses 3a do not extend in the same direction as the sides of the arrangement pattern of the pixels 30. This further reduces moire fringes and enables a stereoimage with a higher quality to be displayed. For example, the erecting unit magnification lens module 2 may be inclined relative to the display device 10 in a manner that the angle θ between the lateral direction of the pixel arrangement of the display device 10 and the lateral direction of the microlens arrangement of the erecting unit magnification lens module 2 is 15 degrees.

Figure 23:
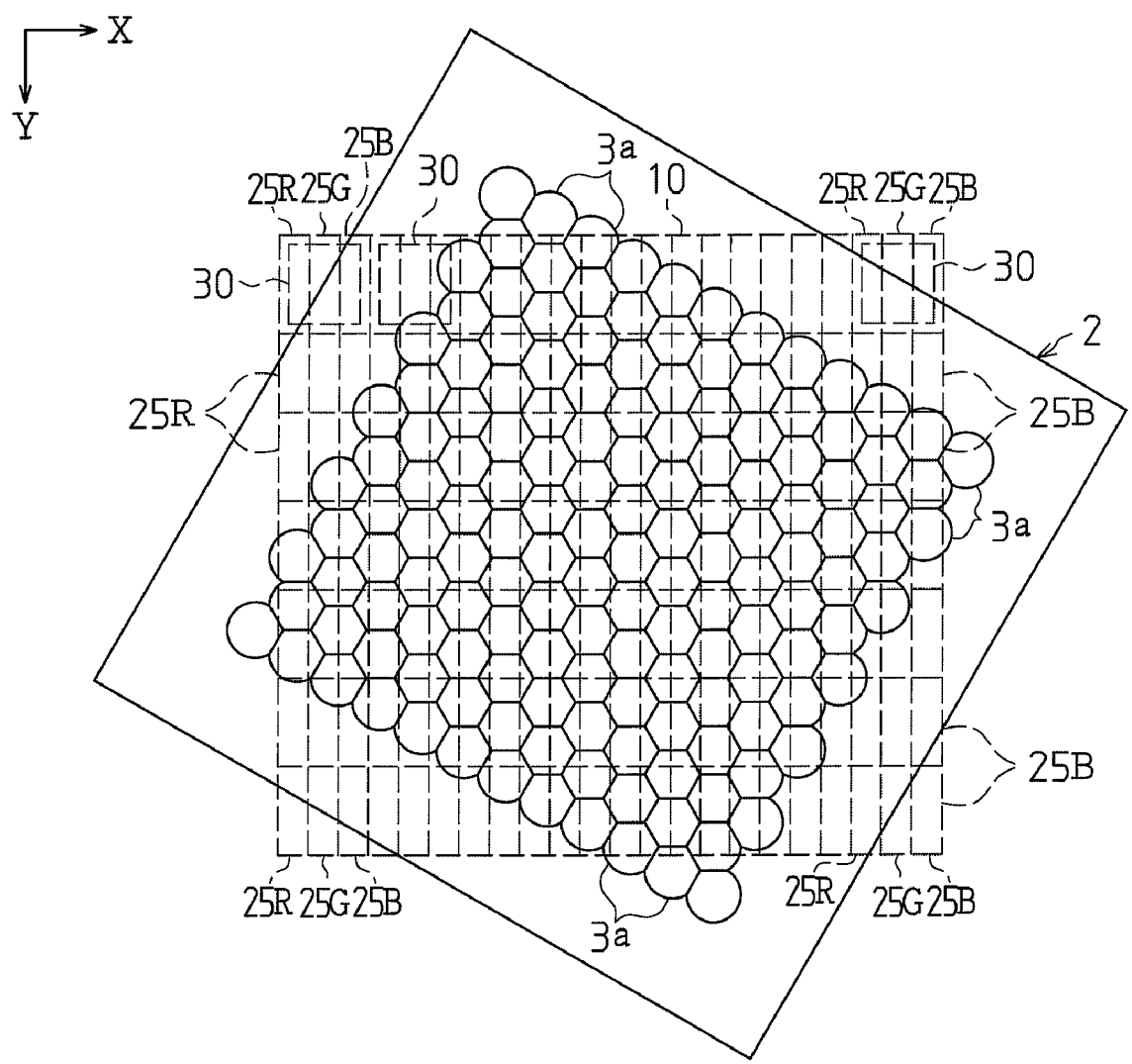
FIG. 23 is a plan view of a modification.
Figure 24:
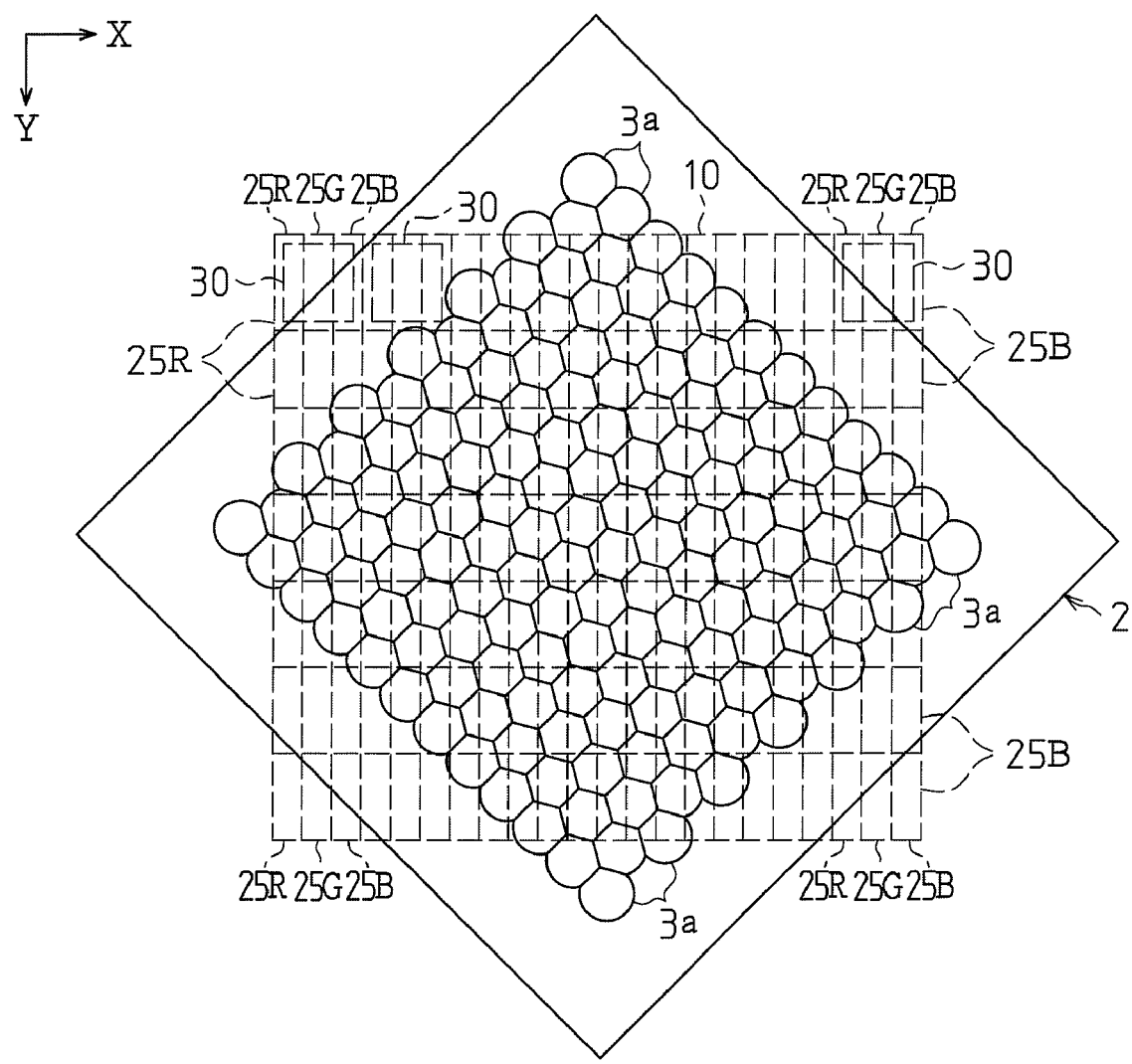
FIG. 24 is a plan view of a modification.
Figure 25:
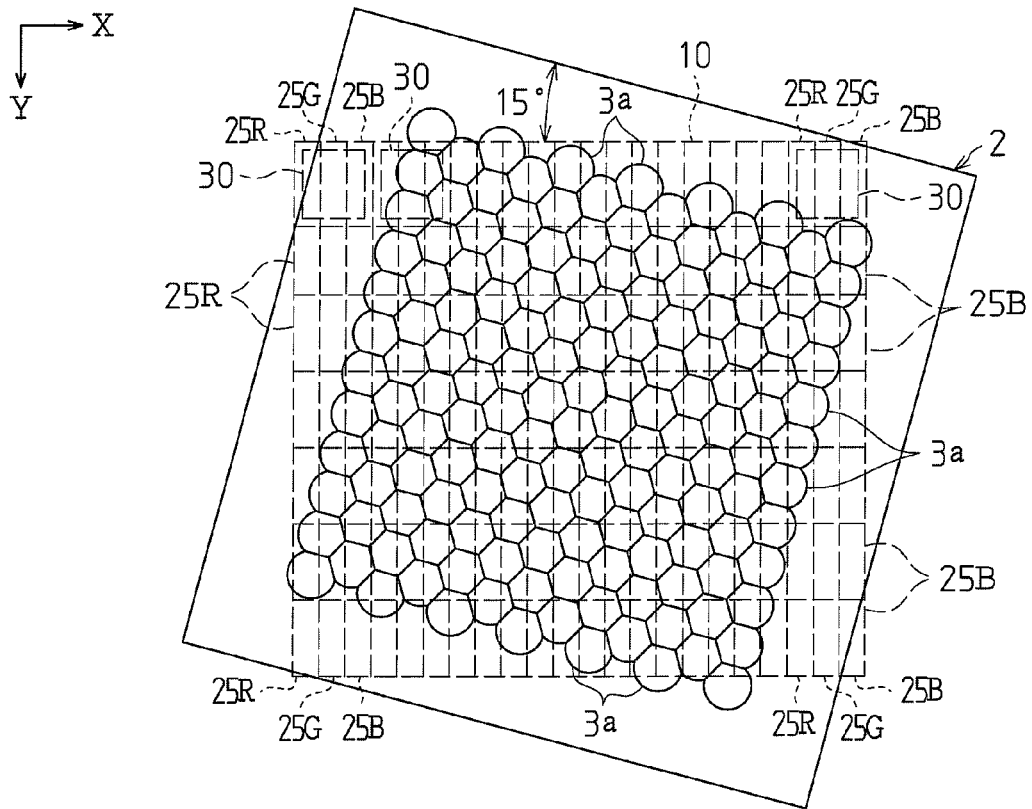
FIG. 25 is a plan view of a modification.

FIGS. 23 to 25 show modifications of the fourth embodiment. In the example of FIG. 25, the angle θ between a side of the erecting unit magnification lens module 2 and a side of the display device 10 is 15 degrees. Tables 6 and 7 show the resolution and the stereoimage quality of the example shown in FIG. 25.

TABLE 6

| Observer Position LA (mm) | 500 | | | |
|---|---|---|---|---|
| Pixel Interval PD (mm) | 0.255 | | | |
| Distance Lz (mm) | 20 | 40 | 60 | 80 |
| Lens Interval PL (mm) | 0.499 | 0.499 | 0.499 | 0.499 |
| Corrected Lens Interval PLo (mm) | 0.476 | 0.454 | 0.429 | 0.402 |
| Resolution (%) | 65 | 38 | 19 | 11 |
| Ratio (PLo/PD) | 1.87 | 1.78 | 1.68 | 1.58 |
| Angle | 15 | 15 | 15 | 15 |
| Image Quality | Good | Good | Good | Exc. |

TABLE 7

| Observer Position LA (mm) | 500 | | | |
|---|---|---|---|---|
| Pixel Interval PD (mm) | 0.297 | | | |
| Distance Lz (mm) | 20 | 40 | 60 | 80 |
| Lens Interval PL (mm) | 0.499 | 0.499 | 0.499 | 0.499 |
| Corrected Lens Interval PLo (mm) | 0.476 | 0.454 | 0.429 | 0.402 |
| Resolution (%) | 65 | 38 | 19 | 11 |
| Ratio (PLo/PD) | 1.6 | 1.53 | 1.44 | 1.35 |
| Angle | 15 | 15 | 15 | 15 |
| Image Quality | Good | Exc. | Exc. | Exc. |

In the example of Table 6, a full color liquid crystal display (229 mm*305 mm) having a diagonal screen size of 15 inches and a pixel pitch PD of 0.255 mm*0.255 mm (sub-pixel pitch q of 0.255 mm*0.099 mm) with a vertical stripe arrangement in which pixels of the same colors are continuously arranged in the vertical direction was used as the display device 10. In the example of Table 6, the erecting unit magnification lens module 2 of example 5 was used.

As shown in Tables 2 and 6, when the distance Lz between the image display screen M and the erecting unit magnification lens module 2 was in the range of 20 mm to 60 mm, moire fringes were clearly observed in example 6, whereas moire fringes were too fine to be observed with the naked eye in the example of Table 6. Further, when the distance Lz was 80 mm, moire fringes were too fine to be observed with the naked eye in example 6, whereas moire fringes were not generated in the example of Table 6.

In the example of Table 7, a full color liquid crystal display (305*407 mm) having a diagonal screen size of 20 inches and a pixel pitch PD of 0.297*0.297 mm (sub-pixel pitch q of 0.297*0.085 mm) with a vertical stripe arrangement in which pixels of the same colors are continuously arranged in the vertical direction was used as the display device 10. In the example of Table 7, the erecting unit magnification lens module 2 of example 5 was used.

As shown in Tables 3 and 7, when the distance Lz between the image display screen M and the erecting unit magnification lens module 2 was 20 mm, moire fringes were clearly observed in example 6, whereas moire fringes generated were too fine to be observed with the naked eye in the example of Table 7. Further, when the distance Lz was 40 mm, moire fringes were too fine to be observed with the naked eye in example 6, whereas moire fringes were not generated in the example of Table 7.

In the second to fourth embodiments, the red, green, and blue sub-pixels 25R, 25G, and 25B of the three colors for forming the pixels 30 of the display device 10 are in a stripe arrangement in which the sub-pixels 25R, 25G, and 25B of the same colors are arranged in the same direction. However, the present invention is not limited to such a structure. For example, the red, green, and blue sub-pixels 25R, 25G, and 25B may be in a delta arrangement in which the red, green, and blue sub-pixels 25R, 25G, and 25B of the three colors are respectively located at the vertexes of triangles.

Figure 26:
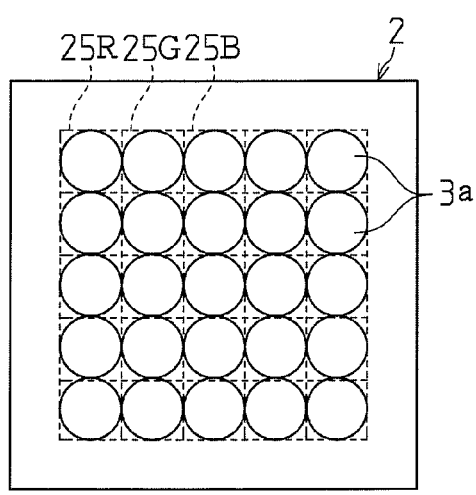
FIG. 26 is a plan view of a modification.

When the display device 10 has the delta arrangement of pixels, the microlenses 3a of the erecting unit magnification lens module 2 may be in a square arrangement. FIG. 26 shows the arrangement relationship between the erecting unit magnification lens module 2 having the square arrangement of microlenses 3a and the display device 10. In this case, the same advantages as the second and third embodiments are obtained.

When the erecting unit magnification lens module 2 and the display device 10 have the arrangement relationship shown in FIG. 26, the sides of the conversion layers 28R, 28G, and 28B of the color filter 23 and the Y-direction sides of the microlenses 3a that are in a square arrangement extend in the same direction (Y-direction). In this case, the arrangement pattern of the pixels 30 of the display device 10 and the arrangement pattern of the microlenses 3a of the erecting unit magnification lens module 2 may interfere with each other. Such interference may generate moire fringes.

Figure 27A:
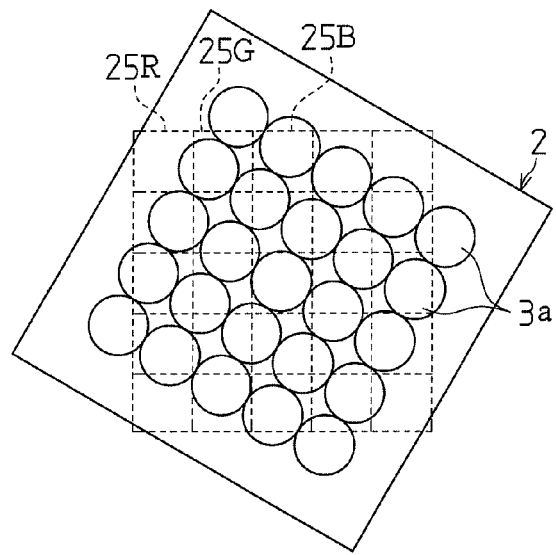
FIG. 27 is a plan view of a modification.
Figure 27B:
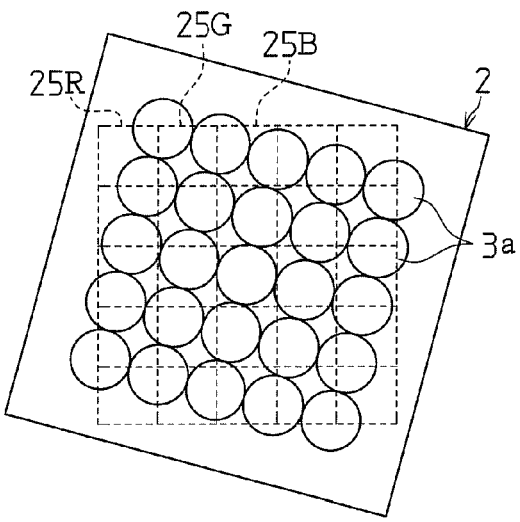
Figure 27C:
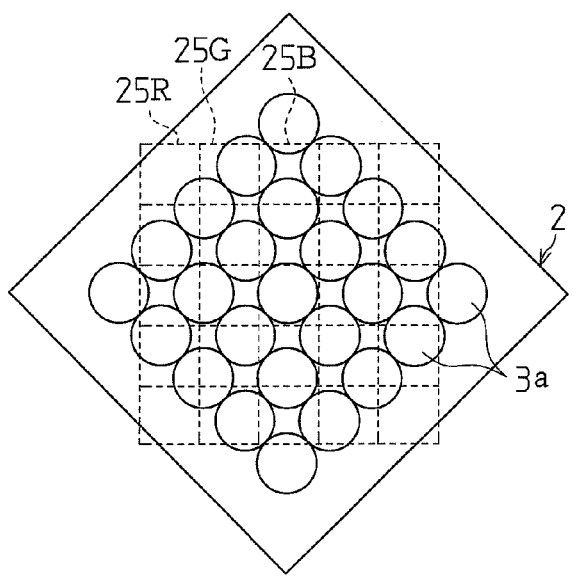

In such a case, the erecting unit magnification lens module 2 and the display device 10 need to be arranged in a manner that the sides of the conversion layers 28R, 28G, and 28B of the color filter 23 and the Y-direction sides of the microlenses 3a that are in a square arrangement do not extend in the same direction (Y-direction) as shown in FIGS. 27A, 27B, and 27C. More specifically, the erecting unit magnification lens module 2 and the display device 10 are inclined relative to each other at a predetermined angle in a manner that the angle θ between the lateral direction (DA direction in FIG. 26) of the arrangement of the pixels 30 and the lateral direction (DB direction in FIG. 26) of the arrangement of the microlenses 3a is an angle other than 0 degrees. In this case, the arrangement pattern of the pixels 30 and the arrangement pattern of the microlenses 3a of the erecting unit magnification lens module 2 do not interfere with each other. As a result, the sides of the arrangement pattern of the microlenses 3a do not extend in the same direction as the sides of the arrangement pattern of the pixels 30. This reduces moire fringes and enables a stereoimage with a higher quality to be displayed.

Figure 28:
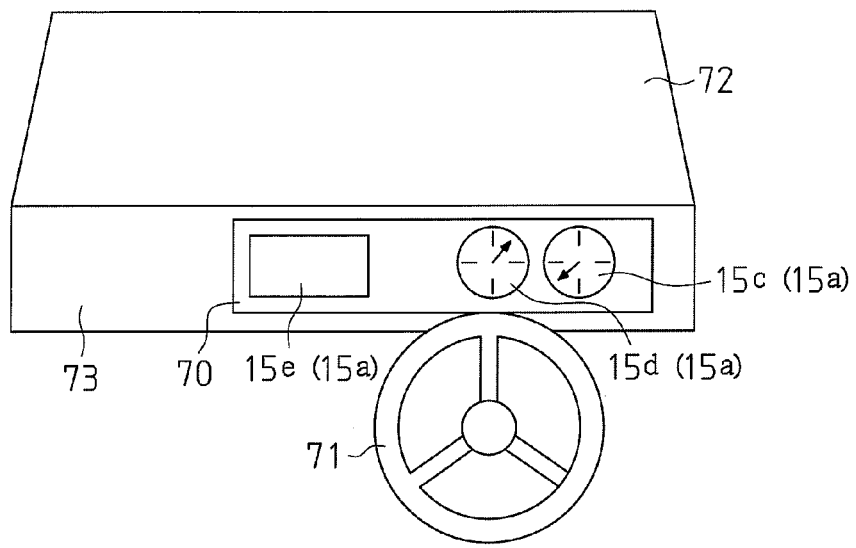
FIG. 28 is a schematic diagram showing an in-vehicle stereoimage display apparatus according to a fifth embodiment of the present invention.

A display apparatus 70 functioning as an in-vehicle stereoimage display apparatus according to a fifth embodiment of the present invention will now be discussed. FIG. 28 shows a passenger compartment of a vehicle including a steering wheel 71, a front windshield screen 72, and a dashboard 73. The display apparatus 70 is configured to display erecting unit magnification stereoimages 15a in an instrument panel area of the dashboard 73. The erecting unit magnification stereoimages 15a displayed by the display apparatus 70 include images (hereafter may be referred to as indicator images) 15c and 15d that dynamically indicate the vehicle state and the travel state in real time. The indicator images 15c and 15d include, for example, symbols, graphics, and characters indicating the vehicle velocity, engine speed, water temperature, driving mode, etc.

The stereoimages 15a further include an additional image 15e indicating information other than the vehicle state and the travel state. The additional image 15e may include, for example, information such as the present time from an apparatus installed in the vehicle, information on a navigation screen stored in a recording medium such as a DVD and an HDD, information such as a television broadcast provided from an information source outside the vehicle through wireless signals, and information on an Internet screen provided from a wireless network through wireless signals. The display apparatus 70 can display the images 15c, 15d, and 15e as stereoimages in one screen.

The structure of the display apparatus 70 will now be described with reference to FIG. 29.

The display apparatus 70 includes a display device 10, an erecting unit magnification lens module 2 (hereafter may be referred to as a lens module 2), a lens movement mechanism, and a controller 76. The display device 10 has a display screen M on which a still image or a moving image is displayed. The erecting unit magnification lens module 2 is arranged to face the display screen M of the display device 10. The lens movement mechanism moves the lens module 2 in an optical axis direction. The controller 76 controls the lens movement mechanism in accordance with the travel velocity of the vehicle.

One example of the display device 10 is a liquid crystal display. One of the lens modules described in the first to fourth embodiments may be used as the lens module 2. As one example, when the liquid crystal display of example 5 having a pixel pitch of 0.321 μm is used as the display device 10, the lens module 2 of example 5 having a lens pitch PL of 0.499 mm may be used.

The lens module 2, which is spaced by a distance WD1 from the display screen M of the display device 10, forms a stereoimage 15a of a still or moving image displayed on the display screen M of the display device 10 at a position spaced from the lens module 2 by a distance WD2 in the direction opposite to the display device 10. When the erecting unit magnification lens module 2 is used, the distance WD2 is the same as the distance WD1. The detailed structure and operation of the erecting unit magnification lens module 2 are described in the first to fourth embodiments.

Figure 29:
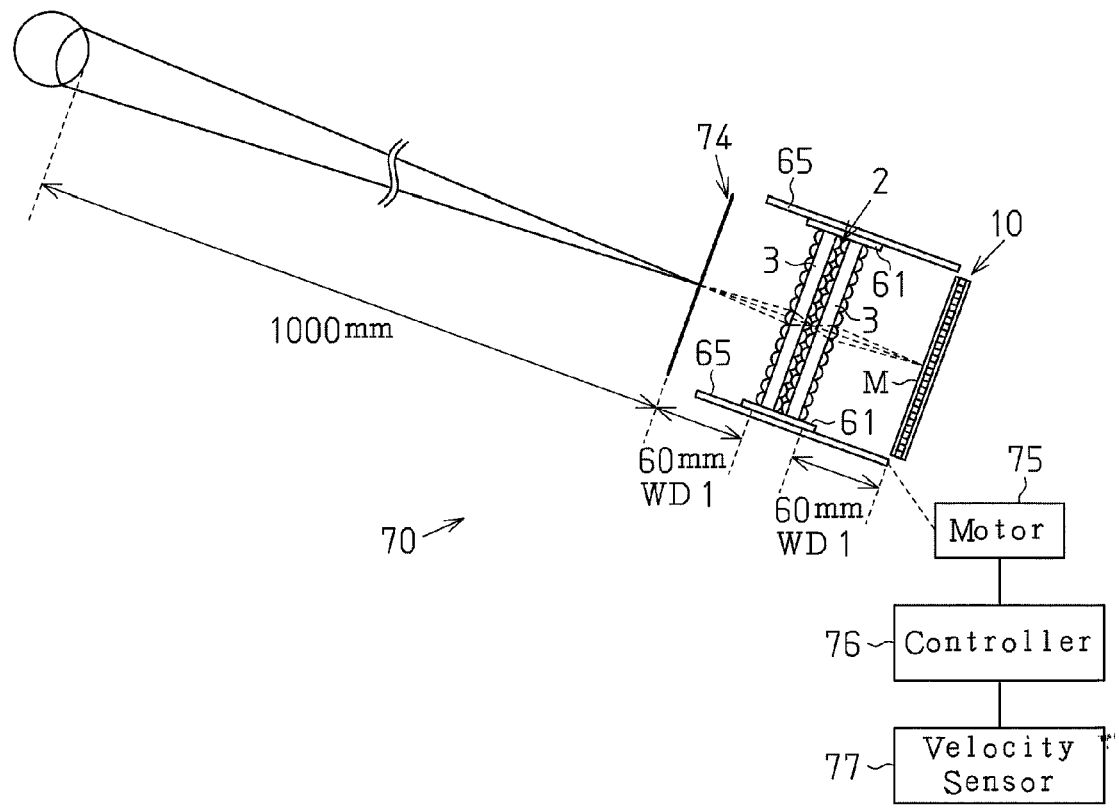
FIG. 29 is a cross-sectional view of the in-vehicle stereoimage display apparatus of FIG. 28.

The display apparatus 70 may include a protective plate 74 (refer to FIG. 29). The protective plate 74 is formed by, for example, a transparent resin plate. The display apparatus 70 may include a case (for example, the case 51 shown in FIG. 13) for accommodating at least the display device 10 and the erecting unit magnification lens module 2. The inner surface of the case defines a space in which an erecting unit magnification stereoimage is formed. It is preferable that the inner surface defining the image formation space be darkly colored. When the display apparatus 70 does not include the case, it is preferable that part of the dashboard 73 on which the display apparatus 70 is attached be darkly colored. The inner surface of the case and the part of the dashboard 73 are preferably darkly colored to reduce ambient light and display clear stereoimages 15a.

The lens movement mechanism includes stages 61 for supporting the lens module 2, guide rails or stages 65 for supporting the stages 61 in a movable manner, and a movement motor 75 for moving the stages 61 on the stages 65. The direct drive mechanism described in the second embodiment may be used in lieu of the movement motor 75.

The controller 76 generates a lens position control signal in accordance with the travel velocity of the vehicle detected with a travel velocity sensor 77, and provides the lens position control signal to the movement motor 75. The movement motor 75 is driven in accordance with the lens position control signal, and changes the distance WD1 between the lens module 2 and the display device 10.

Figure 30:
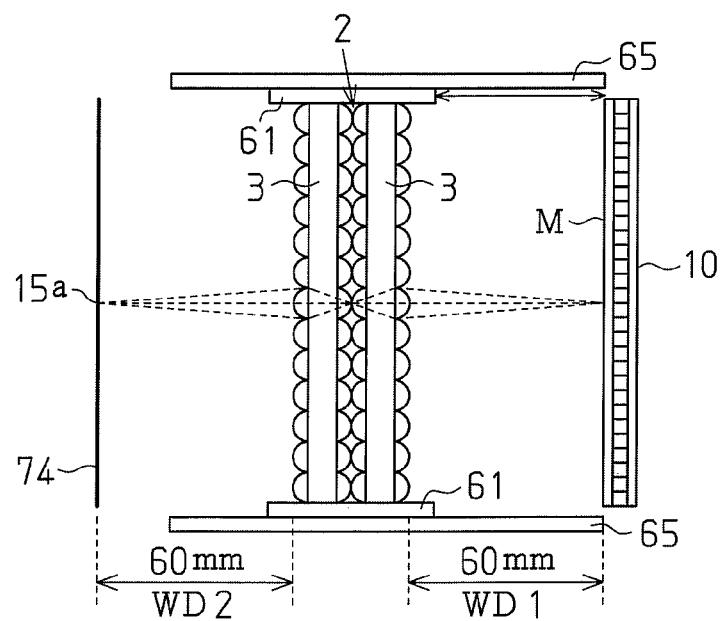
FIG. 30 is a cross-sectional view of the in-vehicle stereoimage display apparatus of FIG. 28 when the vehicle is traveling at a low velocity.
Figure 31:
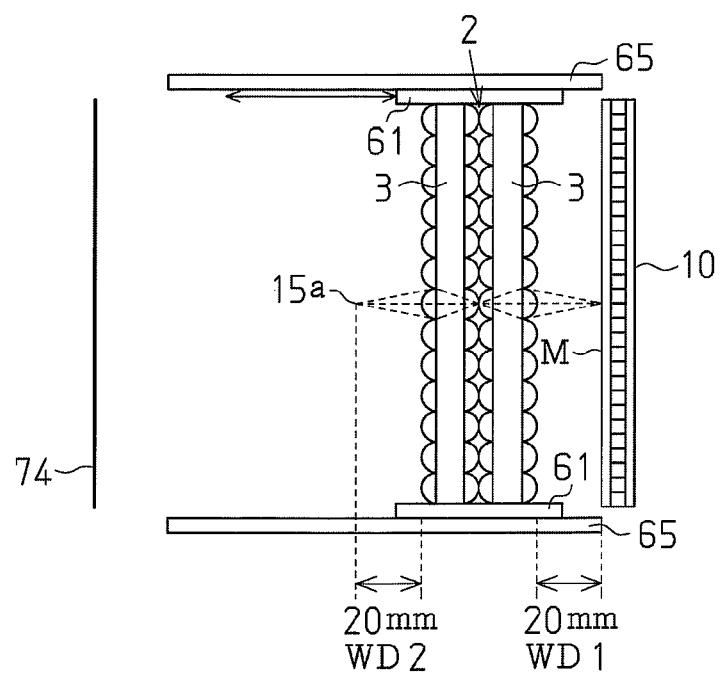
FIG. 31 is a cross-sectional view of the in-vehicle stereoimage display apparatus of FIG. 28 when the vehicle is traveling at a high velocity.

The position control of the lens module 2 performed by the controller 76 will now be described with reference to FIGS. 30 and 31.

The controller 76 controls the movement motor 75 to decrease the distance WD1 as the travel velocity of the vehicle increases. As shown in FIGS. 29 and 30, when the travel velocity of the vehicle is relatively slow (60 km/h or less), the lens module 2 is arranged distant from the display device 10. As shown in FIG. 31, when the travel velocity of the vehicle is relatively fast (over 60 km/h), the lens module 2 is arranged close to the display device 10. In the examples shown in FIGS. 29 and 30, the display device 10 forms the stereoimage 15a (and stereoimages 15c, 15d and 15e) on the protective plate 74. In this case, the distance between the eyes of the driver and the stereoimage 15a is, for example, 1000 mm. In the example shown in FIG. 31, the display device 10 forms the stereoimages 15a (15c, 15d and 15e) in the space between the lens module 2 and the protective plate 74. In this case, the distance between the eyes of the driver and the stereoimage 15a is, for example, 1080 mm.

In the fifth embodiment, the controller 76 changes the distance WD1 in a stepped manner in accordance with the travel velocity of the vehicle. For example, the distance WD1 is changed in two steps, that is, 60 mm (FIG. 30) and 20 mm (FIG. 31). Alternatively, the controller 76 may change the distance WD1 in a stepless manner in accordance with the vehicle velocity.

The display apparatus 70 of the fifth embodiment has the advantages described below.

Normally, when driving a vehicle, a driver alternately looks through the front windshield screen and at the meters fixed to the instrument panel, such as the speedometer and the tachometer. The need to frequently look at different positions may increase eyestrain of the driver. When the travel velocity of the vehicle is relatively fast, such as when traveling along an expressway, the driver's front focal point is located at a relatively distant position. However, when the travel velocity of the vehicle is relatively slow, such as when the vehicle is traveling along an ordinary road, the driver's front focal point is located at a relatively close position. In the conventional vehicle in which the speedometer and the tachometer are fixed to the instrument panel, the driver's focal point distance (distance from the eyes to the focal point) must be changed by a relatively large amount when the travel velocity of the vehicle is relatively fast. The vehicle driver's eyestrain increases when the focal point distance often changes. To reduce the vehicle driver's eyestrain, changes in the focal point distance should be minimized. To minimize the changes in the focal point distance, the display apparatus 70 of the fifth embodiment displays at least the indicator images 15c and 15d at positions more distant from the eyes of the driver when the travel velocity of the vehicle is higher. This structure reduces changes in the focal point distance of the driver as compared with the instrument panel of the conventional vehicle in which the images are displayed only at fixed positions. Consequently, this reduces the vehicle driver's eyestrain.

The display apparatus 70 displays the stereoimages 15a (15c, 15d, and 15e) on one screen. This structure enables the stereoimages indicating the vehicle state and the travel state (indicator images 15c and 15d) and the stereoimage indicating additional information other than the vehicle state and the travel state (additional image 15e) to be displayed in a compact area within the instrument panel area of the dashboard 73. Thus, there is no need for an exclusive display that shows a navigation system screen or the like. This increases the freedom of design around the driver seat.

The first to fifth embodiments may be modified as described below.

In the above embodiments, the lens module 2 may be formed by three or more lens array plates 3.

In the above embodiments, the shape and the arrangement of the microlenses 3a are determined in a manner that no gap is formed between adjacent microlenses 3a. Thus, for example, each lens array plate 3 may have microlenses 3a that are in a square arrangement. Each microlens 3a may be square.

In the above embodiments, the microlenses 3a of each lens array plate 3 is arranged regularly at a constant pitch and without any gaps formed between adjacent microlenses 3a. The microlenses 3a may also be arranged regularly with constant gaps formed between adjacent microlenses 3a.

In the above embodiments, each lens array plate 3 may be a flat plate microlens array of microlenses 3a with spherical or non-spherical surfaces arranged on only one main surface of the substrate 4.

In the above embodiments, the display apparatus 1 (refer to FIGS. 12 and 13) may include a reflection reducing filter on the front side (image side) of the lens array plates 3. The reflection reducing filter may be formed from any material that reduces reflected light, such as a colored glass plate.

In the above embodiments, the display device 10 is not limited to a liquid crystal display and may be another type of display, such as an organic EL display or a plasma display.

In the above embodiments, the two lens array plates 3 may be spaced from each other as long as they have optical capabilities equivalent to those when the two lens array plates 3 are arranged in contact with each other.

In the fifth embodiment, the display apparatus 70 may show a plurality of images 15e on one screen as stereoimages indicating additional information other than the vehicle state and the travel state.

In the fifth embodiment, the display apparatus 70 may selectively display the images 15c and 15d indicating the vehicle state and the travel state without displaying the additional image 15e, or may selectively display the additional image 15e without displaying the images 15c and 15d.

In the fifth embodiment, the lens module 2 may be arranged to face the entire display screen M of the display device 10. In another example, the lens module 2 may include a first lens module, which is arranged to face a first local area displaying the indicator images 15c and 15d in the display screen M of the display device 10, and a second lens module, which is arranged to face a second local area displaying the image 15e in the display screen M. In this case, the first lens module may be moved when the indicator images 15c and 15d are displayed, and the second lens module may be moved when the image 15e is displayed.

In a further example of the fifth embodiment, the lens module 2 may be arranged to face only local portions in which the indicator images 15c and 15d are displayed in the display screen M of the display device 10. In this case, the display positions of the indicator images 15c and 15d can be changed, without changing the display position of the image 15e.

In the fifth embodiment, the erecting unit magnification stereoimage 15a is formed when the image (display screen M) and the lens module 2 are arranged at positions spaced from each other by a predetermined distance. The display apparatus 70 of the fifth embodiment may include an optical system that forms an erecting unit magnification stereoimage also when the lens module is moved from the position that is spaced by the predetermined distance, or may include an optical system that forms an erect and variably-magnified image also when the lens module is moved from the position that is spaced by the predetermined distance. When the display apparatus 70 includes an optical system that forms an erect and variably-magnified image, the predetermined distance (distance between an image of which an erecting unit magnification stereoimage is formed and the lens module 2) may be within the movable range of the lens module 2 or outside the movable range of the lens module 2.

The invention claimed is:

1. An in-vehicle stereoimage display apparatus installed in a vehicle, the apparatus being characterized by:
   a display device including a display screen;
   an erecting unit magnification lens module, spaced from and facing toward the display screen of the display device, for forming an erecting unit magnification stereoimage of an image displayed on the display screen;
   a lens movement mechanism for movably supporting the erecting unit magnification lens module; and
   a controller, connected to the lens movement mechanism, for changing the position of the erecting unit magnification lens module in accordance with the travel velocity of the vehicle.

2. The in-vehicle stereoimage display apparatus according to claim 1, being characterized in that:
   the erecting unit magnification lens module forms the erecting unit magnification stereoimage at a side of the lens module opposite to the display device, and at least a portion of a space in which the erecting unit magnification stereoimage is formed is surrounded by a darkly colored member.

3. The in-vehicle stereoimage display apparatus according to claim 1, being characterized in that the controller controls the lens movement mechanism so that the distance between the vehicle driver's eyes and the erecting unit magnification stereoimage increases as the travel velocity of the vehicle increases.

4. The in-vehicle stereoimage display apparatus according to claim 3, being characterized in that the controller increases the distance between the vehicle driver's eyes and the erecting unit magnification stereoimage in a stepped manner when the travel velocity of the vehicle increases.

5. The in-vehicle stereoimage display apparatus according to claim 3, being characterized in that the controller increases the distance between the vehicle driver's eyes and the erecting unit magnification stereoimage in a stepless manner when the travel velocity of the vehicle increases.

6. The in-vehicle stereoimage display apparatus according to claim 1, being characterized in that the controller controls the lens movement mechanism so that the distance between the erecting unit magnification lens module and the display device decreases as the travel velocity of the vehicle increases.

7. The in-vehicle stereoimage display apparatus according to claim 1, being characterized in that the erecting unit magnification stereoimage includes an image that dynamically indicates a vehicle state and a travel state of the vehicle in real time.

8. The in-vehicle stereoimage display apparatus according to claim 7, being characterized in that the erecting unit magnification stereoimage includes an additional image that indicates information other than the vehicle state and the travel state.

9. The in-vehicle stereoimage display apparatus according to claim 1, being characterized in that:
   the erecting unit magnification lens module includes at least two lens array plates, each lens array plate includes a plurality of microlenses, with each having a peak, and the microlenses having parallel optical axes;
   the peaks of the microlenses in one of the at least two lens array plates are in contact with or arranged close to the peaks of the microlenses in the other one of the at least two lens array plates; and
   the microlenses in each lens array plate each have a predetermined spherical aberration that is greater than a minimum spherical aberration or a predetermined comatic aberration that is greater than a minimum comatic aberration.

10. The in-vehicle stereoimage display apparatus according to claim 9, being characterized in that the lens module has a thickness in the direction of the optical axes of the microlenses, and the thickness is less than a designed thickness value that minimizes the spherical aberration or the comatic aberration of each microlens.

11. The in-vehicle stereoimage display apparatus according to claim 9, being characterized in that the at least two lens array plates are integrated to form one of the erecting unit magnification lens module.

12. The in-vehicle stereoimage display apparatus according to claim 9, being characterized in that:
   when the at least two lens array plates spaced from the display screen of the display device by a front side working distance, a light beam from the display screen passes through a single point on a surface of each microlens; and
   when the front side working distance changes, the light beam passes through a point differing from the single point on the surface of each microlens.

13. The in-vehicle stereoimage display apparatus according to claim 9, being characterized in that each lens array plate has a rear side working distance in a range of 5 to 150 mm, in which the resolution is 10% or greater for 1 Lp (line pair/mm), with a resolution change rate being greater than 0%/mm and 2%/mm or less.

14. The in-vehicle stereoimage display apparatus according to claim 9, being characterized in that each lens array plate includes:
   a substrate having two main surfaces; and
   a plurality of microlenses having spherical or non-spherical surfaces arranged on one or both of the main surfaces of the substrate.

15. The in-vehicle stereoimage display apparatus according to claim 9, being characterized in that each lens array plate is made of a transparent resin.

16. The in-vehicle stereoimage display apparatus according to claim 1, being characterized by:
   a case for accommodating the lens module and the display device;
   wherein the case has an inner chamber for accommodating a medium, the lens module is arranged between the inner chamber and the display device, and the lens module forms an image displayed on the display screen of the display device in the inner chamber of the case.

17. The in-vehicle stereoimage display apparatus according to claim 16, being characterized in that the display device displays a two-dimensional image.

18. The in-vehicle stereoimage display apparatus according to claim 1, being characterized in that:
   the erecting unit magnification lens module includes a plurality of microlenses regularly arranged and an object side focal distance;
   the display device includes a display screen spaced from the erecting unit magnification lens module by the object side focal distance and a plurality of regularly arranged pixels;

the erecting unit magnification lens module forms a stereoimage viewed as a floating image with an image shown on the image display screen;

the lens movement mechanism enables the spaced distance between the erecting unit magnification lens module and the image display screen to be varied within a predetermined range; and when the spaced distance between the erecting unit magnification lens module and the image display screen is varied within the predetermined range, the resolution of the erecting unit magnification lens module changes; and when the spaced distance is within the predetermined range, the resolution of the erecting unit magnification lens module is greater than an upper limit value at which a blur is observable with human eyes.

19. The in-vehicle stereoimage display apparatus according to claim 18, being characterized in that:

the erecting unit magnification lens module is formed by at least two lens array plates, and each lens array plate includes a plurality of microlenses, with each having an optical axis and a peak, and the optical axes of the microlenses being parallel to one another;

the peaks of the microlenses in one of the at least two lens array plates are in contact with or arranged close to the peaks of the microlenses in the other one of the at least two lens array plates; and the microlenses in each lens array plate each have a predetermined spherical aberration that is greater than a minimum spherical aberration or a predetermined comatic aberration that is greater than a minimum comatic aberration.

20. The in-vehicle stereoimage display apparatus according to claim 19, being characterized in that when the plurality of pixels has a pixel pitch PD, the microlenses have a lens pitch PL, LA represents a distance between a viewpoint and the image display screen, LB represents a distance between the stereoimage and the viewpoint, Lz represents the spaced distance, and PLo represents a corrected lens pitch obtained by correcting the lens pitch PL in accordance with the distances LA, LB, and Lz, and when the spaced distance Lz is minimal, the corrected lens pitch PLo satisfies the expression of $$(1.20+n*1.50) \leq PLo/PD \leq (1.70+n*1.50),$$

where n=0, 1, 2, 3, . . . .

21. The in-vehicle stereoimage display apparatus according to claim 19, being characterized in that the resolution MTF of the lens module is 10% or greater at 1 LP/mm when the spaced distance is within the predetermined range, and the resolution of the lens module is maximal when the spaced distance is a minimum value in the predetermined range.

22. The in-vehicle stereoimage display apparatus according to claim 19, being characterized in that the plurality of pixels are in a vertical stripe arrangement, and the plurality of microlenses are in a hexagonal arrangement or in a square arrangement.

23. The in-vehicle stereoimage display apparatus according to claim 22, being characterized in that each pixel is formed by a plurality of sub-pixels that are arranged at a constant pitch and respectively correspond to a plurality of colors, and the plurality of sub-pixels form a vertical stripe arrangement in which sub-pixels of the same color are continuously arranged in a vertical direction.

24. The in-vehicle stereoimage display apparatus according to claim 22, being characterized in that each microlens is hexagonal, and some of the pixels form a line, some of the microlenses form another line, and the line of the pixels is inclined at an angle of 90 degrees relative to the line formed by the microlenses.

25. The in-vehicle stereoimage display apparatus according to claim 19, being characterized in that the plurality of pixels are in a delta arrangement, and the plurality of microlenses are in a hexagonal arrangement or in a square arrangement.

26. The in-vehicle stereoimage display apparatus according to claim 19, being characterized in that the plurality of pixels form lines, the plurality of microlenses form lines, and the lines of the pixels are inclined relative to the lines of the microlenses.

* * * * *